US012265302B2

(12) United States Patent
Park et al.

(10) Patent No.: US 12,265,302 B2
(45) Date of Patent: Apr. 1, 2025

(54) DISPLAY DEVICE

(71) Applicant: LG ELECTRONICS INC., Seoul (KR)

(72) Inventors: Jihee Park, Seoul (KR); Jihye Yoon, Seoul (KR); Kilhoon Lee, Seoul (KR); Kiryong Jeong, Seoul (KR); Keonwoo Kim, Seoul (KR); Nayeon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/554,446

(22) PCT Filed: Dec. 24, 2021

(86) PCT No.: PCT/KR2021/019792
§ 371 (c)(1),
(2) Date: Oct. 6, 2023

(87) PCT Pub. No.: WO2022/215830
PCT Pub. Date: Oct. 13, 2022

(65) Prior Publication Data
US 2024/0184167 A1  Jun. 6, 2024

(30) Foreign Application Priority Data

Apr. 8, 2021  (KR) .......................... 10-2021-0045932
Apr. 8, 2021  (KR) .......................... 10-2021-0045933

(51) Int. Cl.
*G02F 1/13357*  (2006.01)
*G02F 1/1333*   (2006.01)

(52) U.S. Cl.
CPC .. *G02F 1/133611* (2013.01); *G02F 1/133314* (2021.01); *G02F 1/133605* (2013.01); *G02F 1/133608* (2013.01)

(58) Field of Classification Search
CPC ......... G02F 1/133611; G02F 1/133314; G02F 1/133605; G02F 1/133608; G02F 1/133603; G02F 1/133308; G02B 5/08
See application file for complete search history.

(56) References Cited

U.S. PATENT DOCUMENTS 12,007,635 B2 *  6/2024  Oshima ..................... G09F 9/30
2010/0053505 A1 * 3/2010  Yamazaki ......... G02F 1/133603
349/67

(Continued)

FOREIGN PATENT DOCUMENTS

KR      101217663      1/2013
KR      101797279      12/2017

(Continued)

OTHER PUBLICATIONS

PCT International Application No. PCT/KR2021/019792 International Search Report dated Apr. 15, 2022, 4 pages.

*Primary Examiner* — Bryon T Gyllstrom
(74) *Attorney, Agent, or Firm* — LEE, HONG, DEGERMAN, KANG & WAIMEY

(57) ABSTRACT

Disclosed is a display device. The display device according to an aspect of the present disclosure may include: a display panel; a frame which is positioned behind the display panel, and to which the display panel is coupled; a plurality of substrates which are positioned between the display panel and the frame, on which a plurality of light sources providing light to the display panel are mounted, and which are formed of flat plates separated from each other; and a reflective sheet positioned between the display panel and the plurality of substrates, covering the plurality of substrates, and having a plurality of holes corresponding to the plurality of light sources, wherein the plurality of substrates may include: a first substrate; a second substrate next to the first substrate; and a third substrate next to the second substrate, (Continued)

wherein the reflective sheet may include: a first reflective sheet covering at least a portion of the first substrate and a portion of the second substrate; and a second reflective sheet covering another portion of the second substrate and at least a portion of the third substrate.

16 Claims, 21 Drawing Sheets

(56) References Cited

U.S. PATENT DOCUMENTS

| | | | | |
|---|---|---|---|---|
| 2010/0079977 A1* | 4/2010 | Lee | ................... | G02F 1/133611 |
| | | | | 362/97.1 |
| 2011/0058118 A1* | 3/2011 | Kim | ................... | G02F 1/133605 |
| | | | | 349/61 |
| 2019/0302352 A1 | 10/2019 | Xu et al. | | |

FOREIGN PATENT DOCUMENTS

| | | |
|---|---|---|
| KR | 101804892 | 12/2017 |
| KR | 1020180035330 | 4/2018 |

* cited by examiner

[FIG. 1]
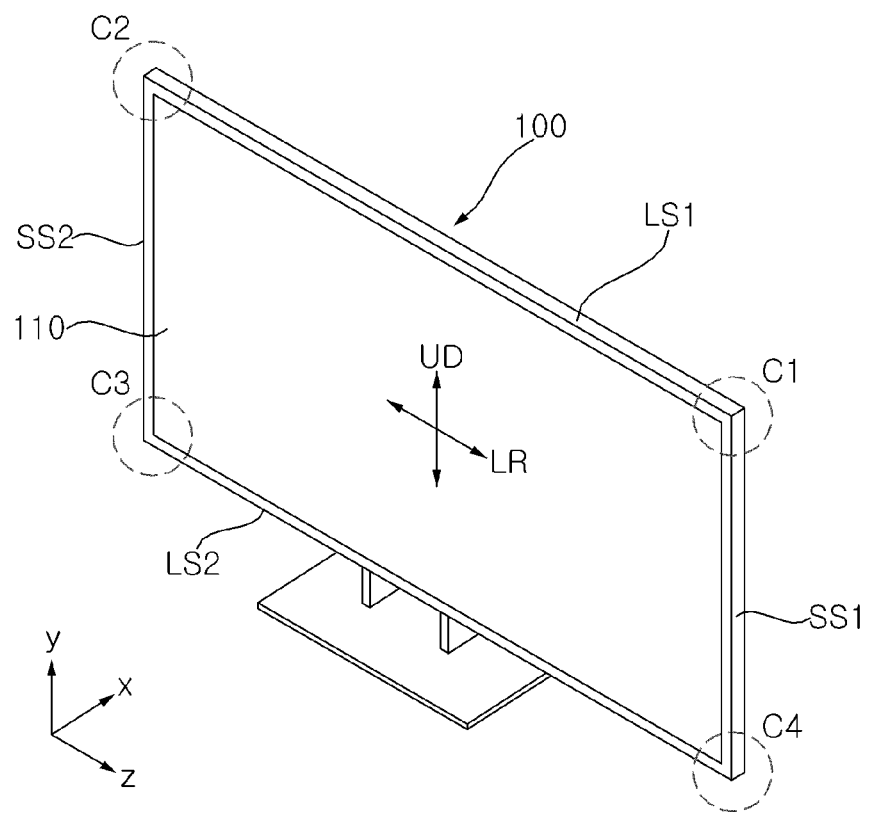
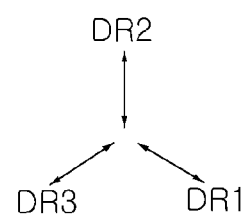

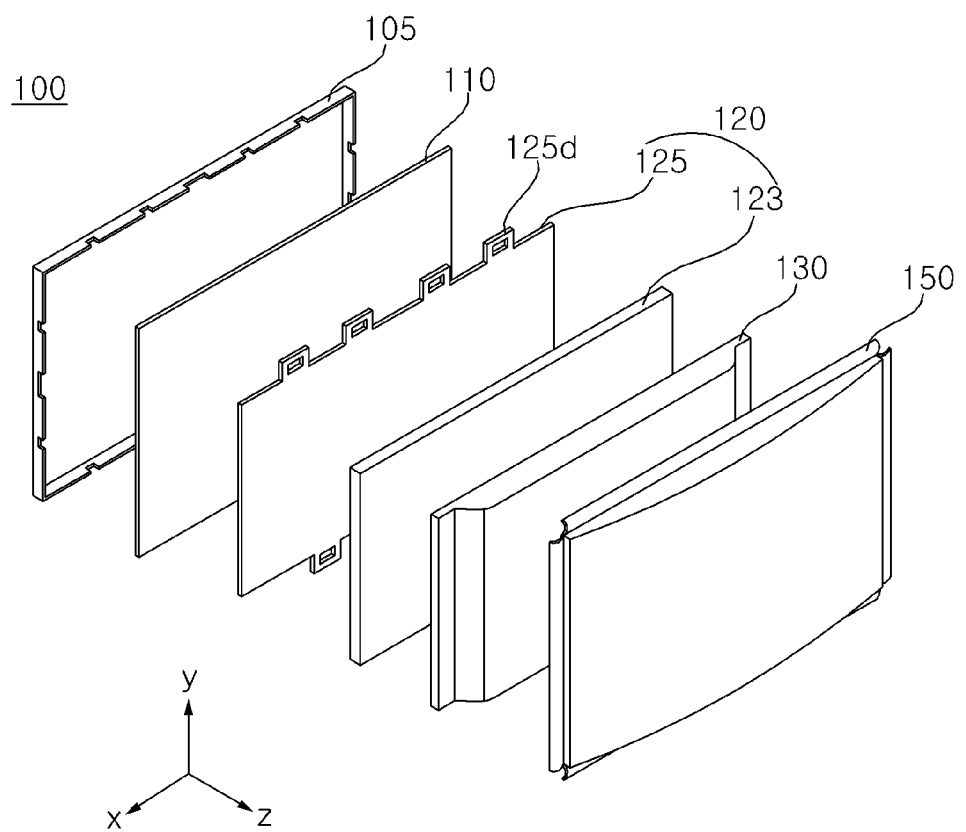
[FIG. 2]

[FIG. 3]
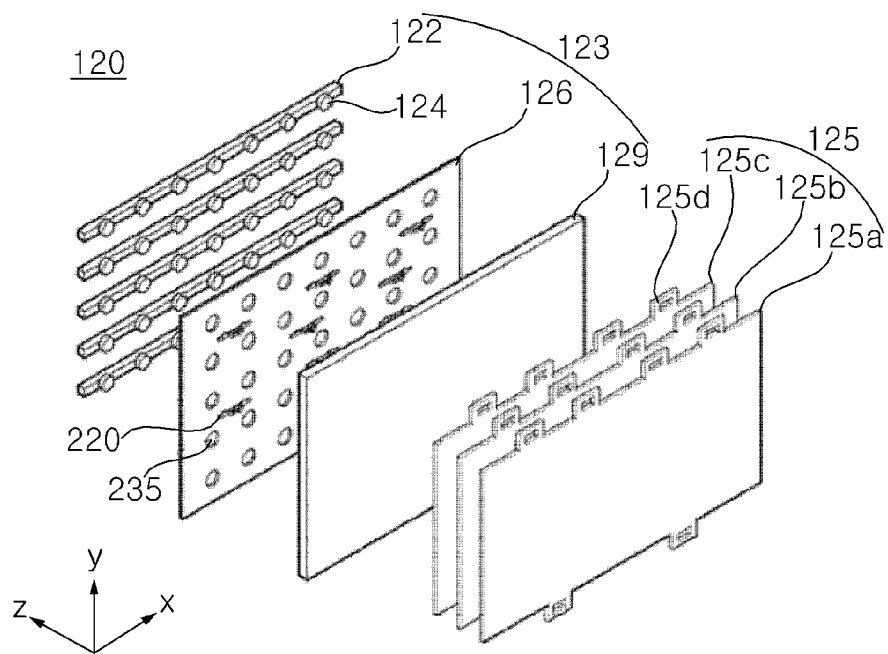

[FIG. 4]
222
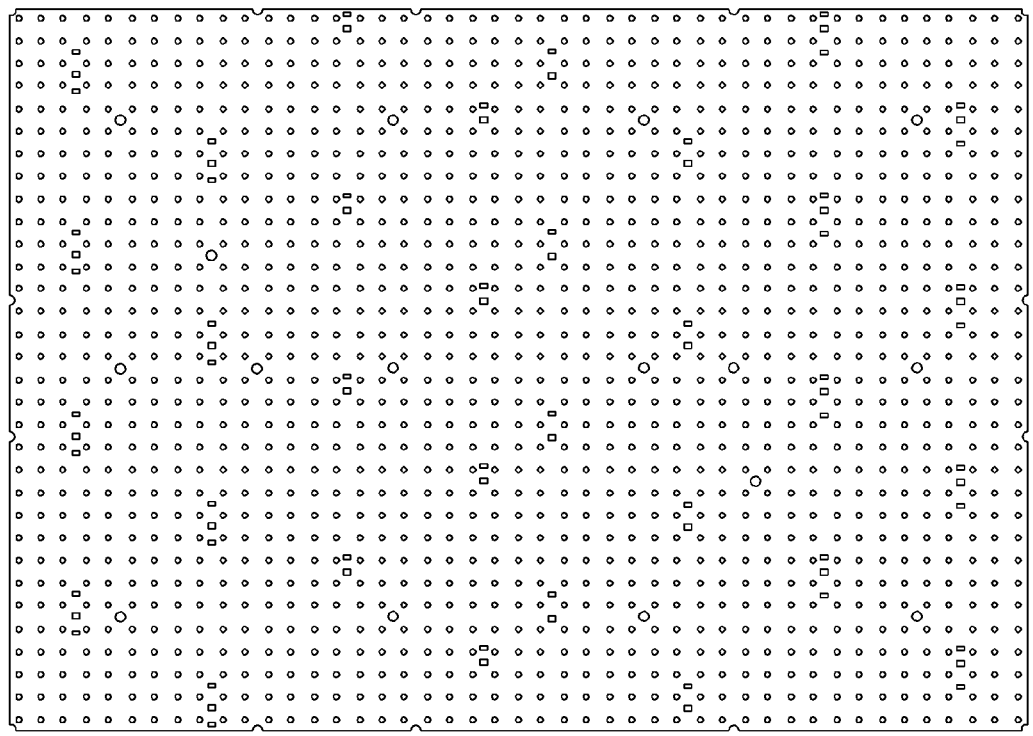

[FIG. 5]
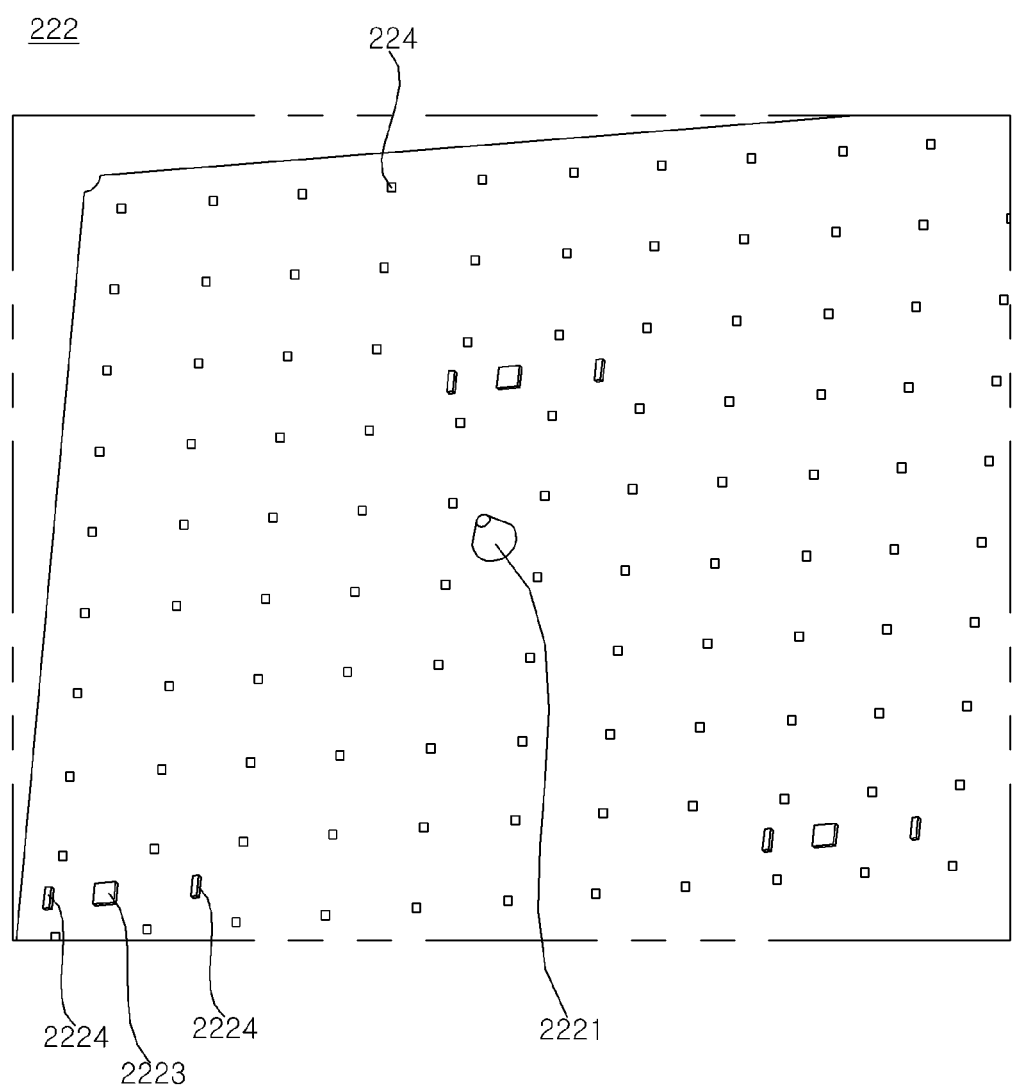

[FIG. 6]
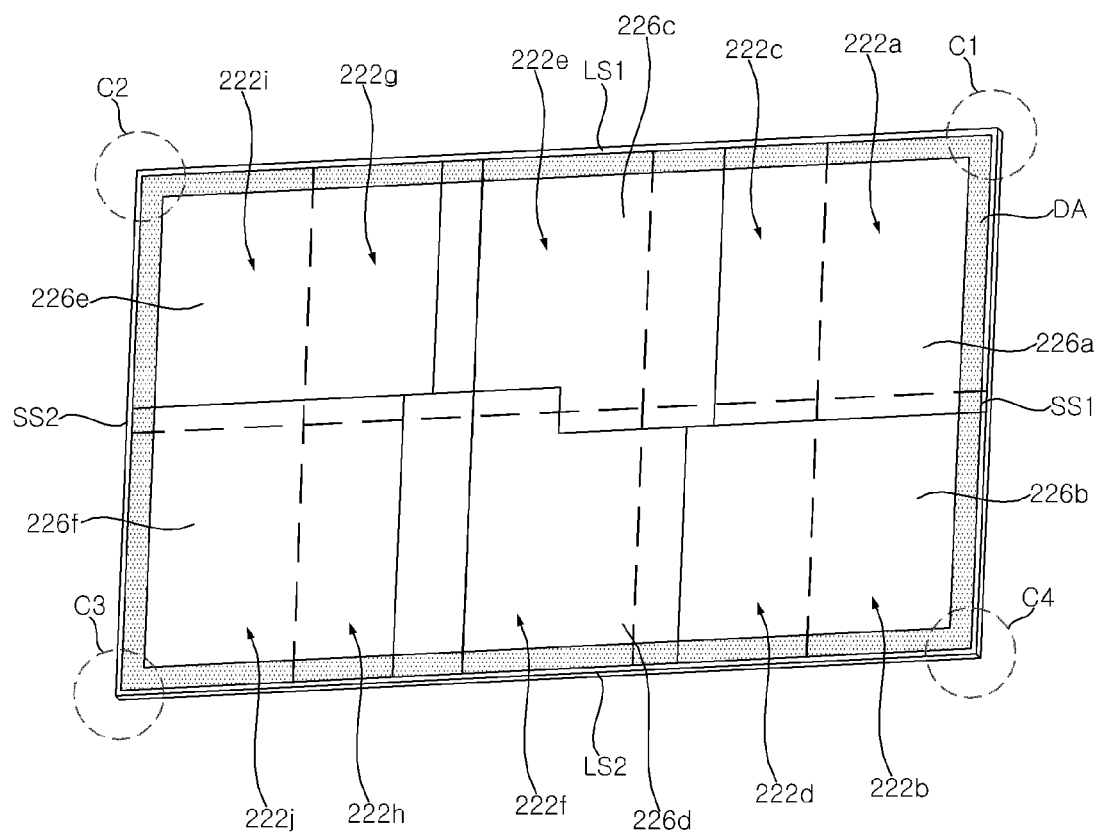

[FIG. 7]
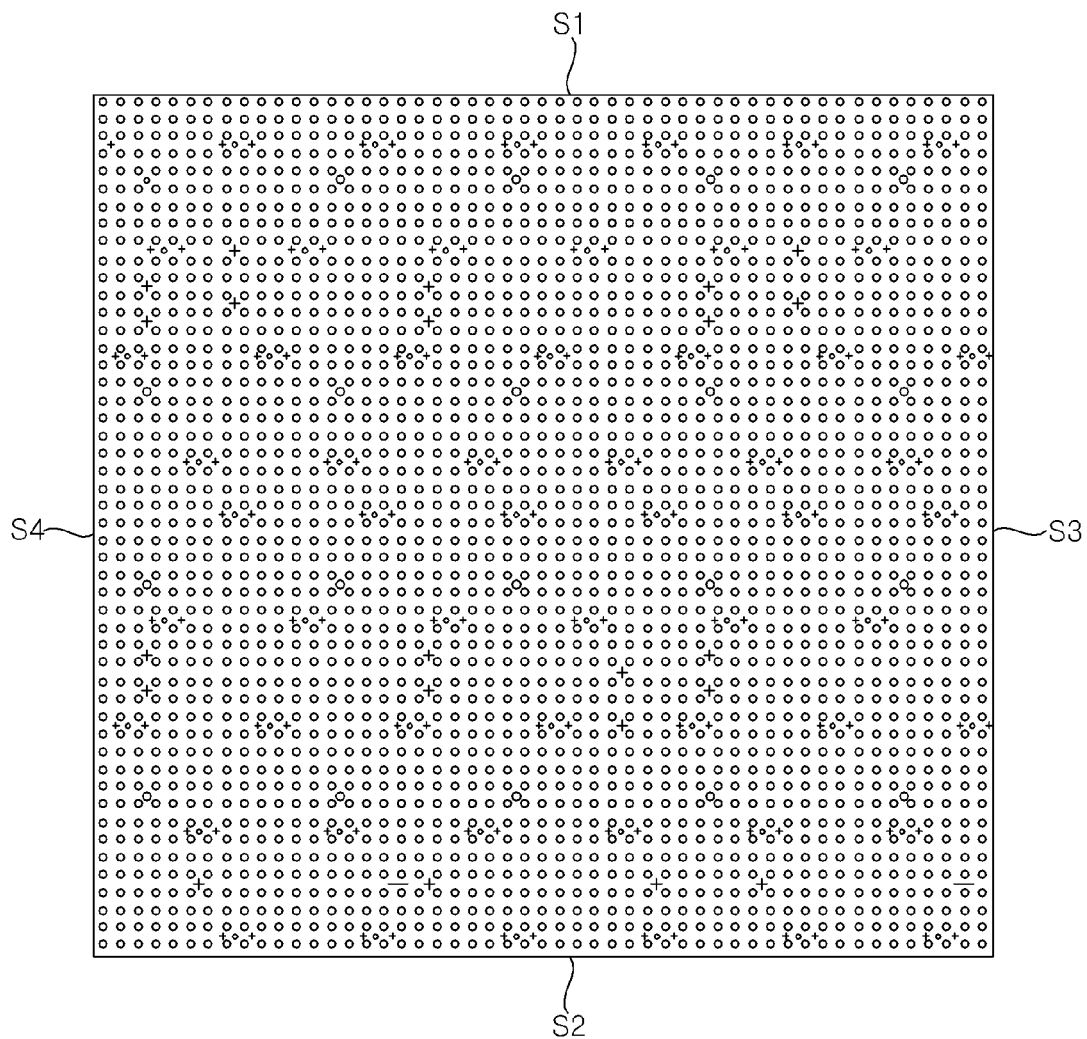

[FIG. 8]
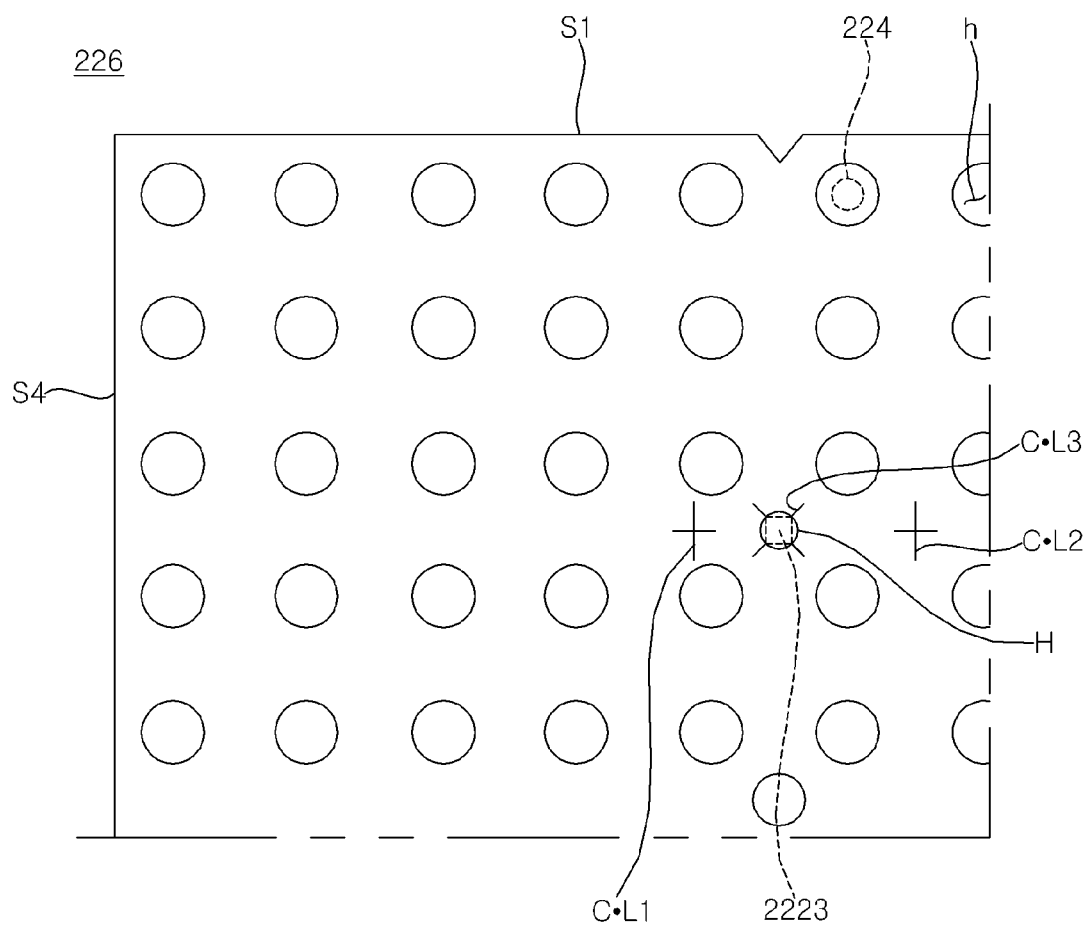

[FIG. 9]
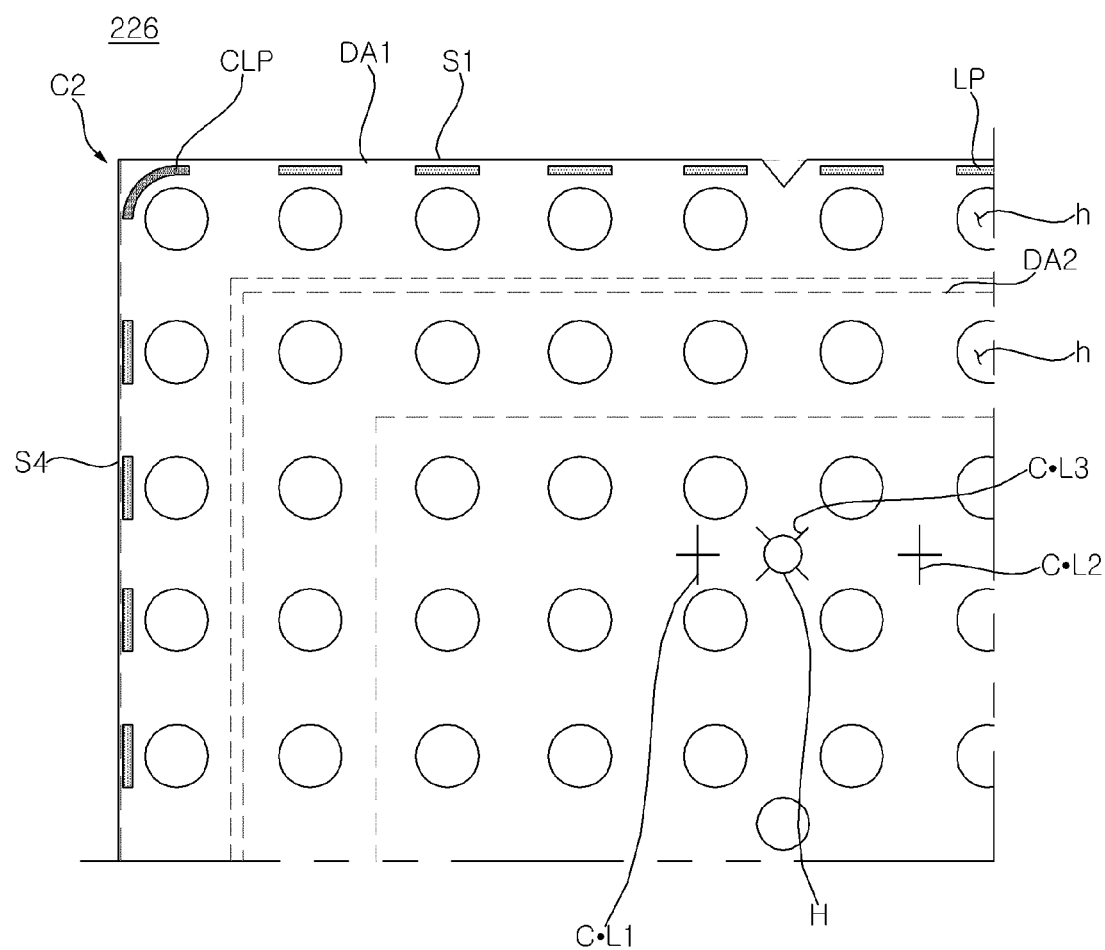

[FIG. 10]
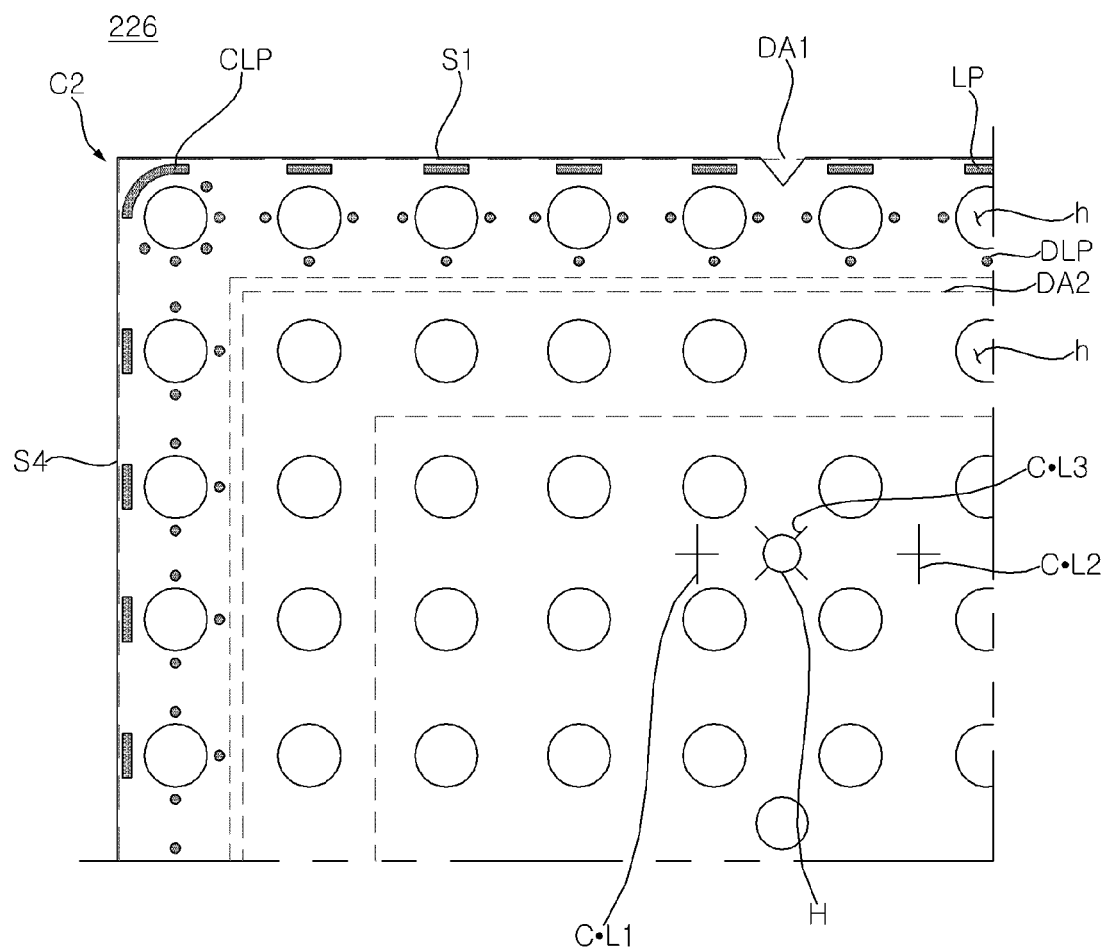

[FIG. 11]
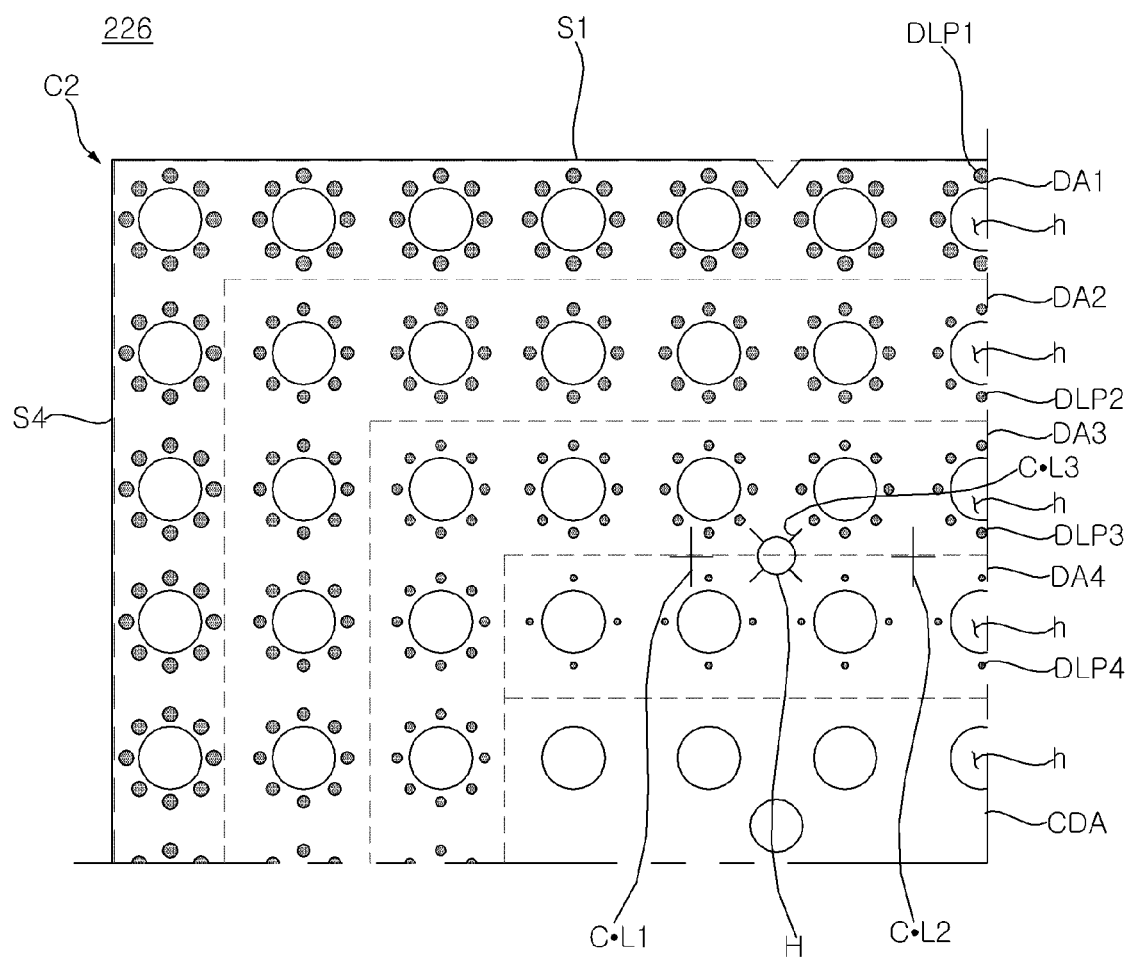

[FIG. 12]
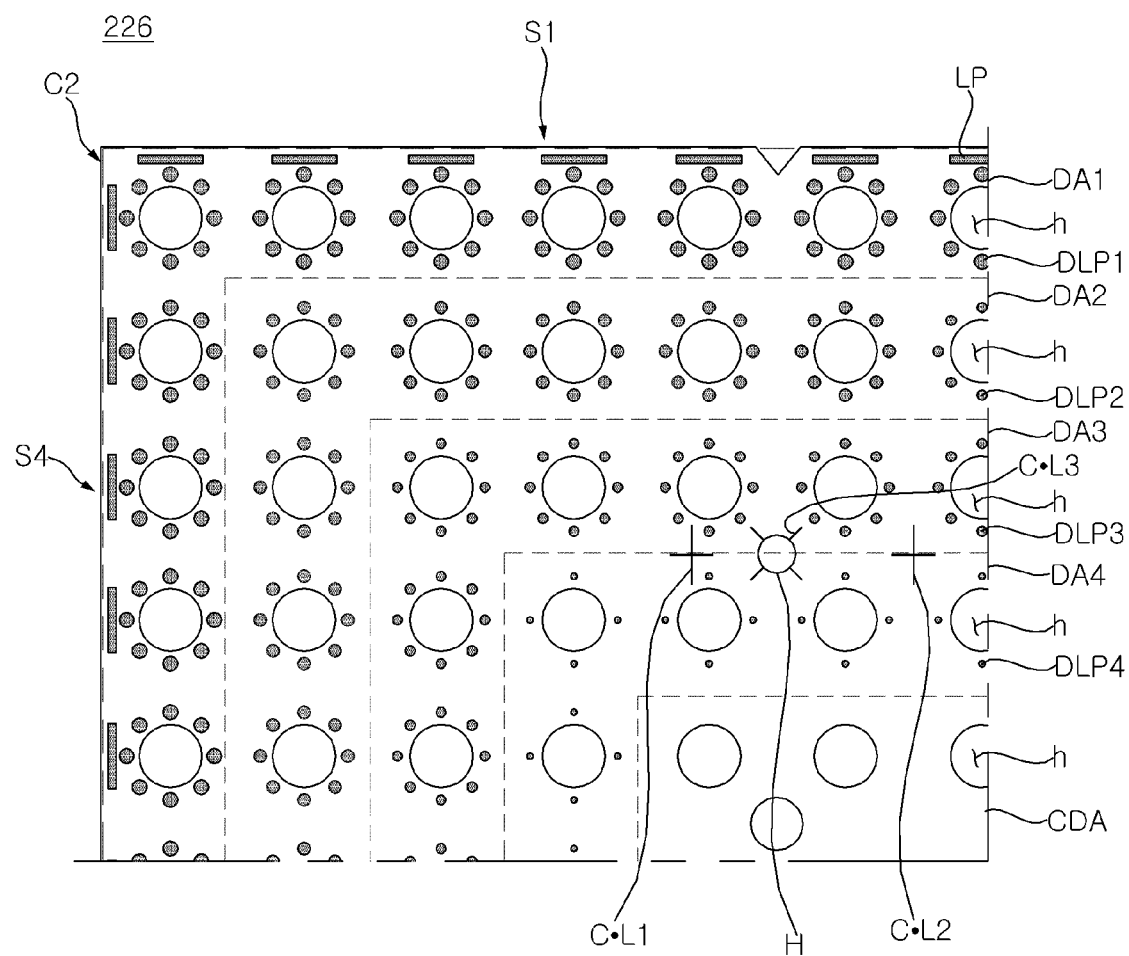

[FIG. 13]
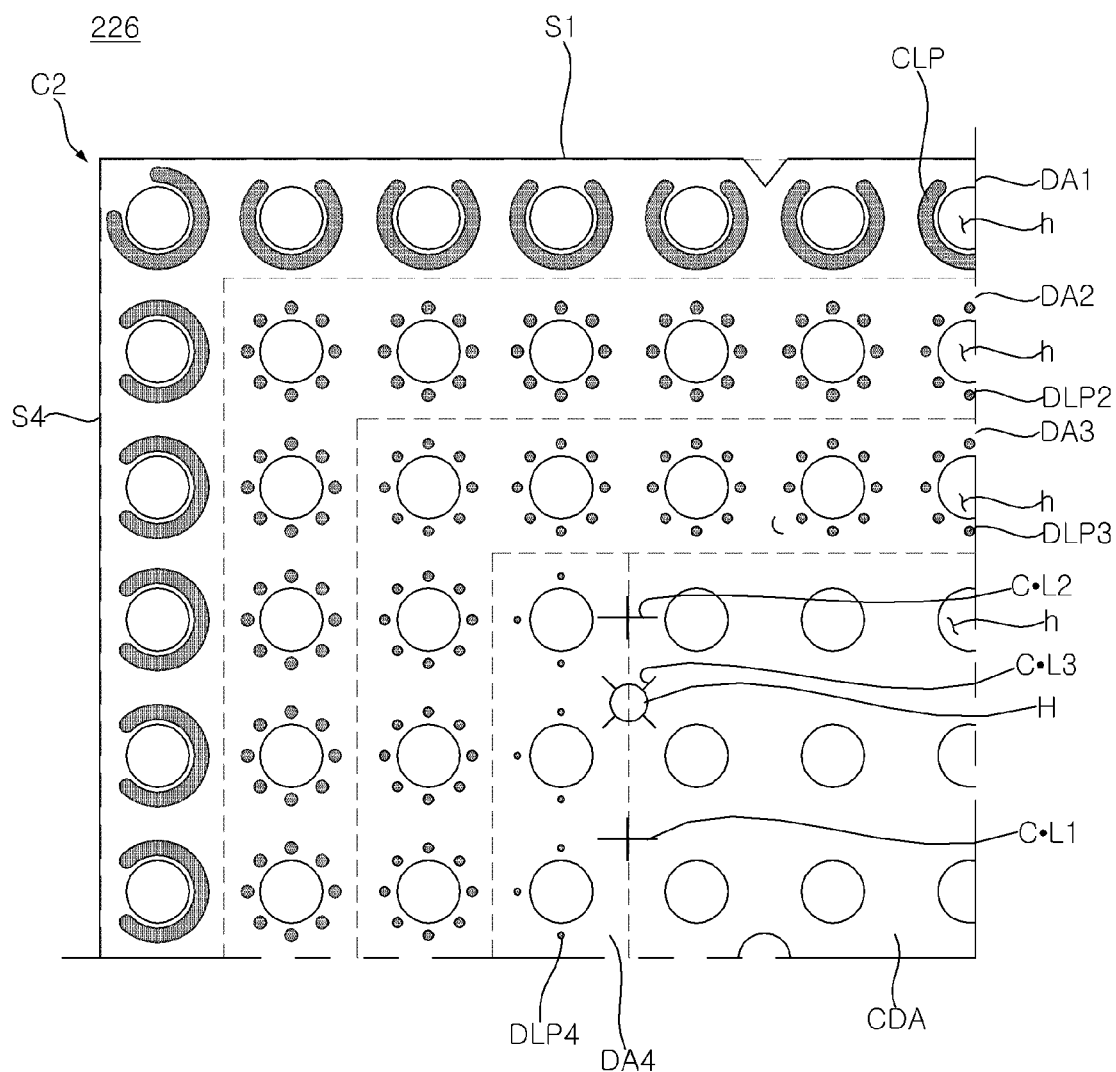

[FIG. 14]
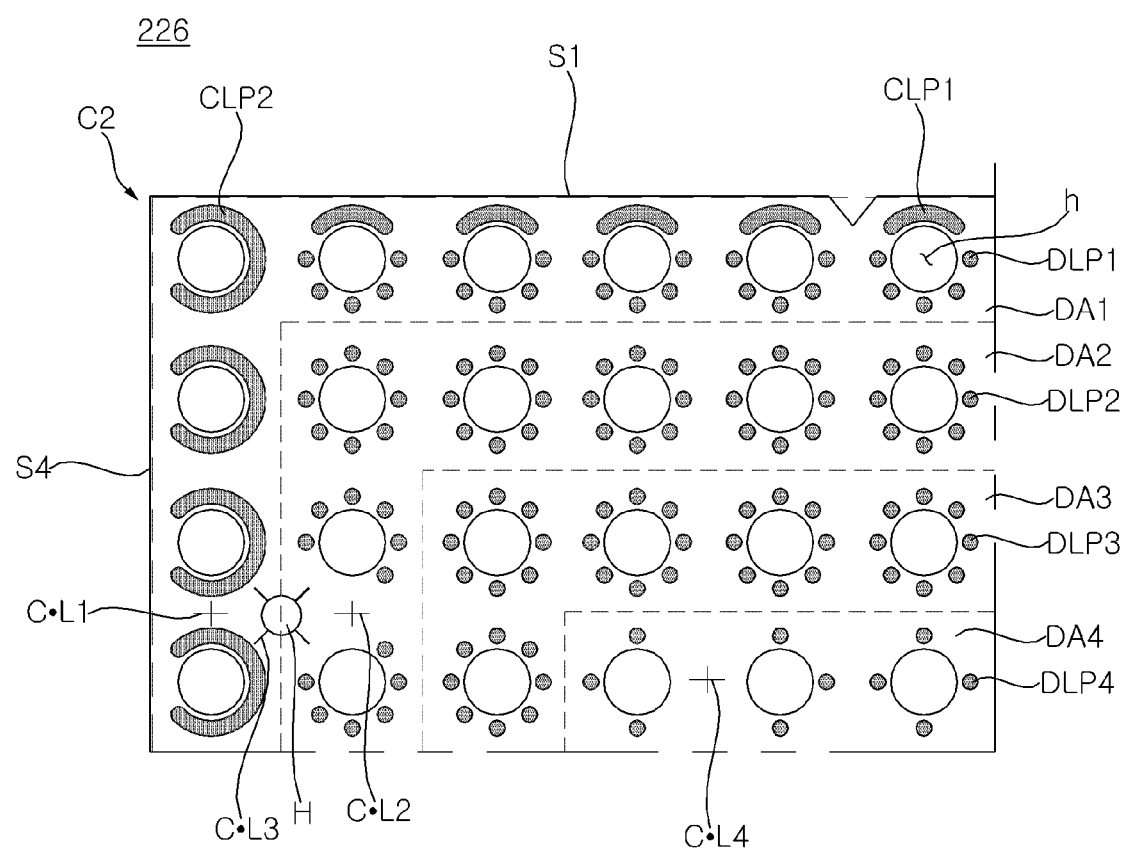

[FIG. 15]
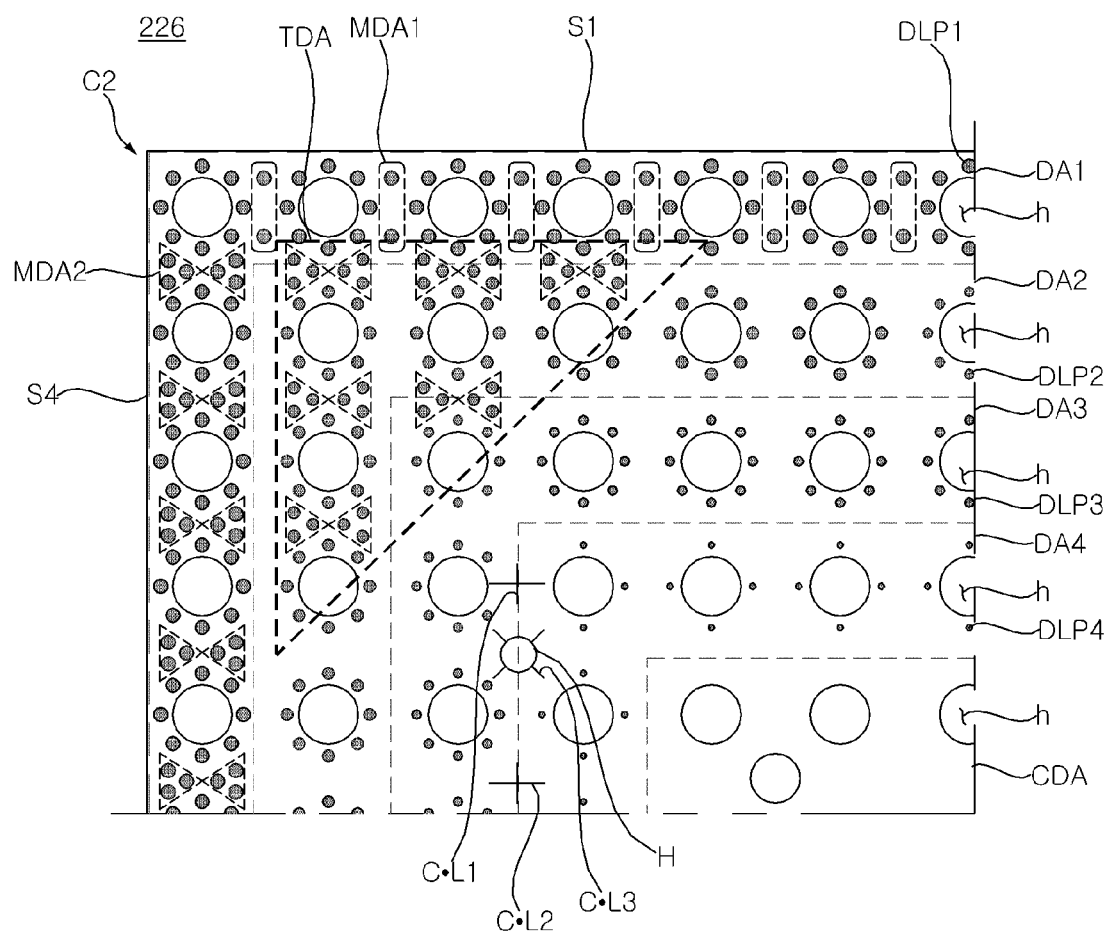

[FIG. 16]
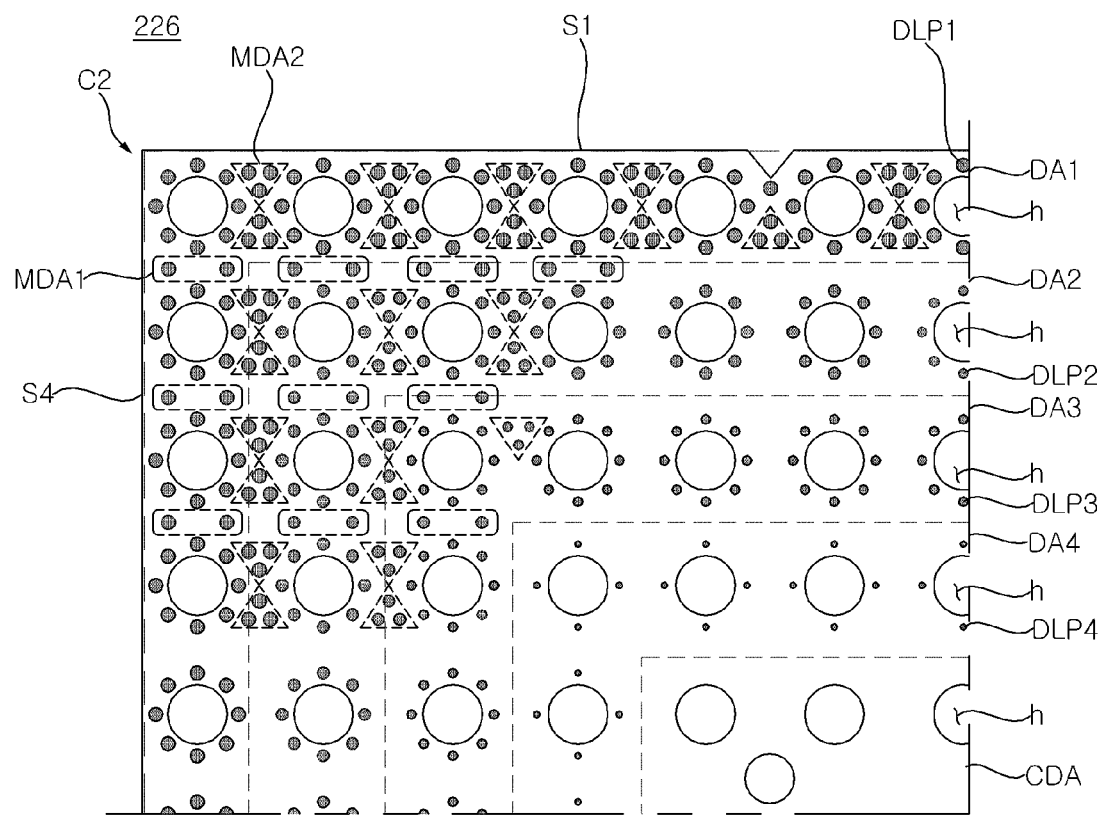

[FIG. 17]
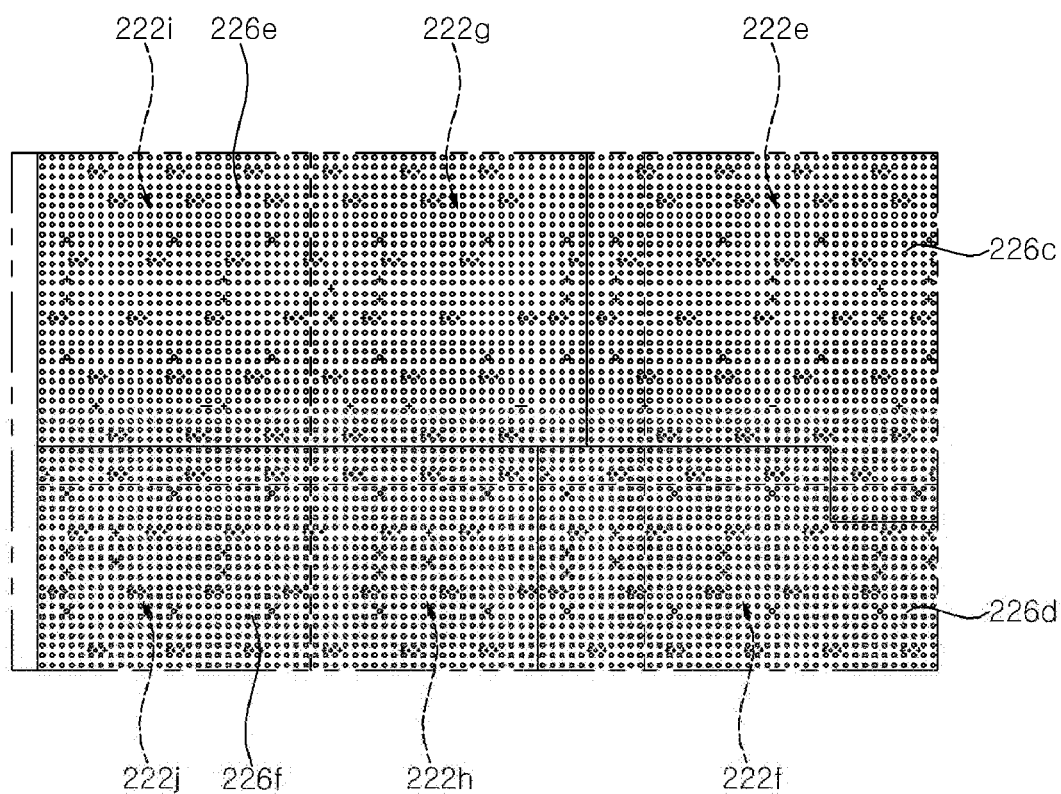

[FIG. 18]
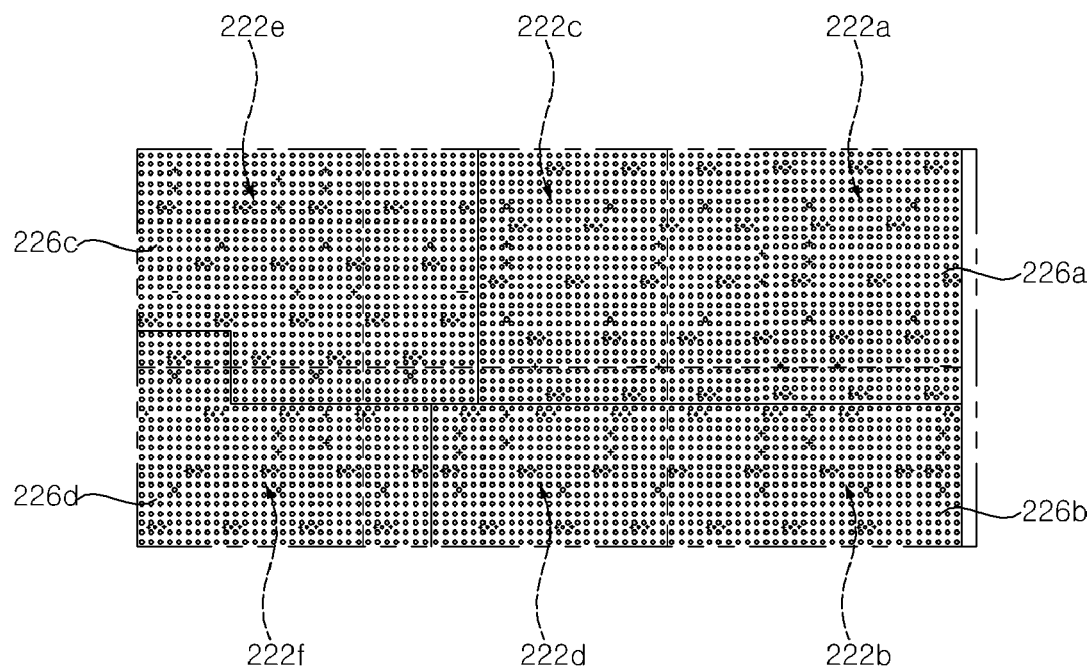

[FIG. 19]
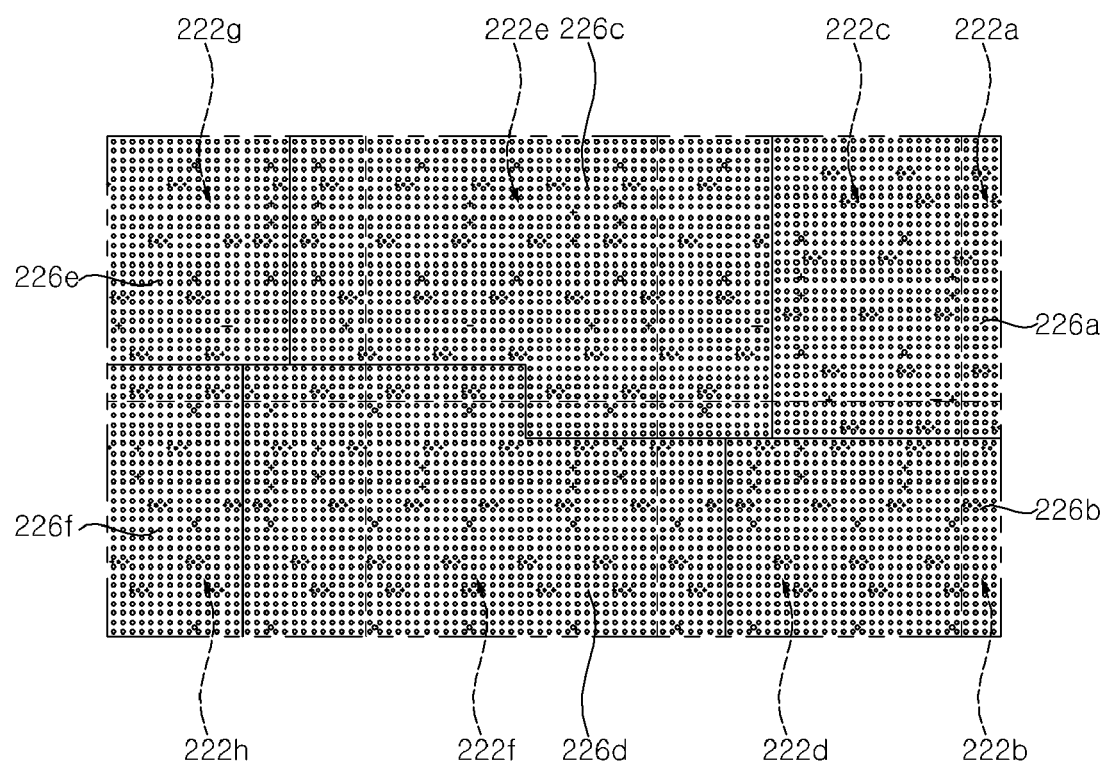

[FIG. 20]
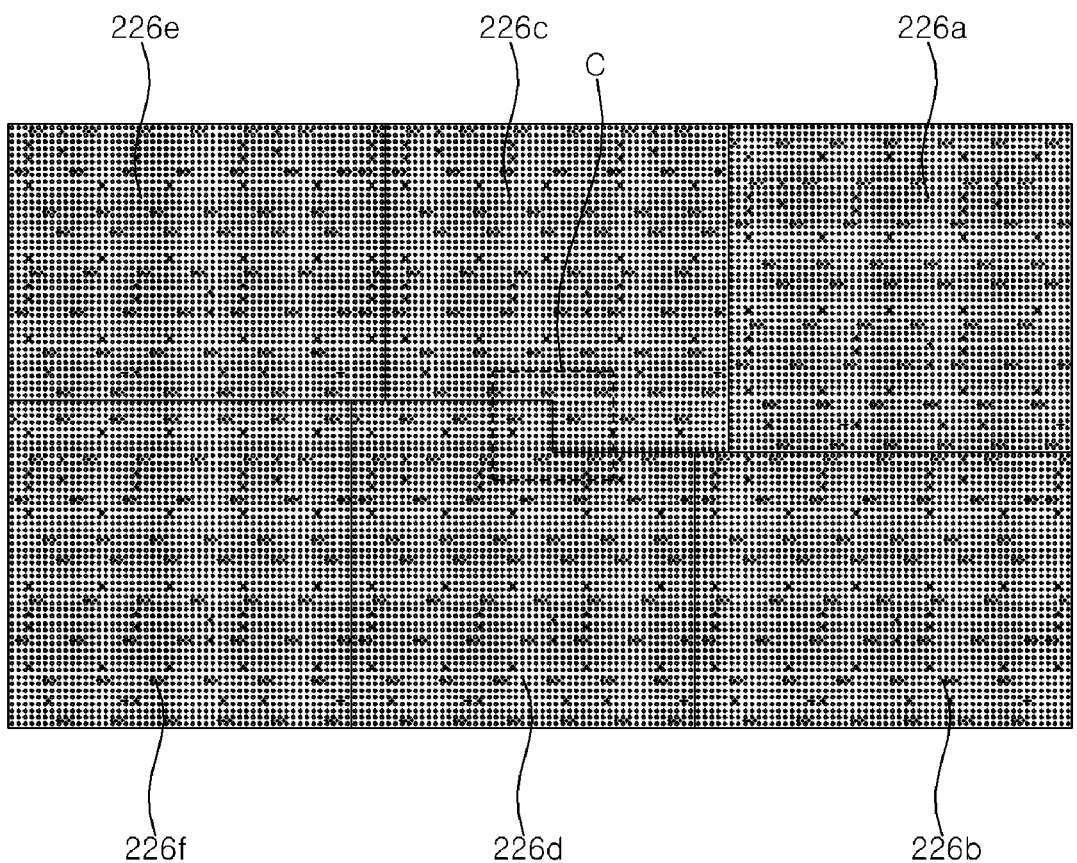

[FIG. 21]
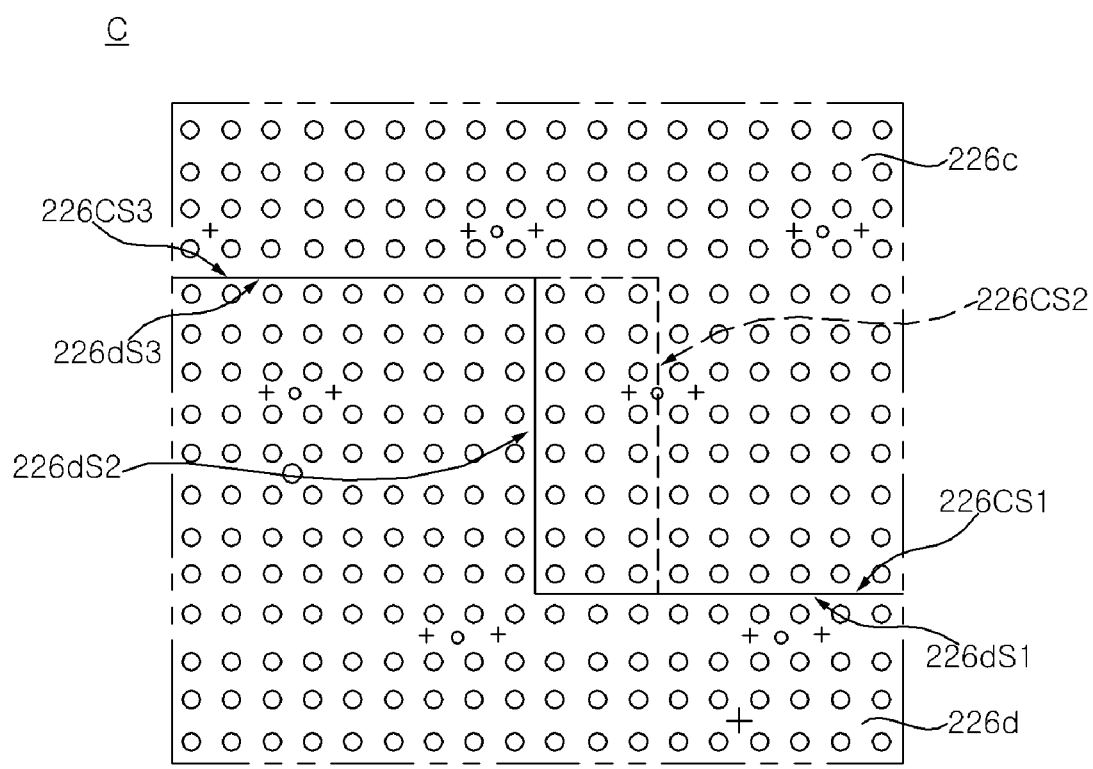

DISPLAY DEVICE

CROSS-REFERENCE TO RELATED APPLICATION(S)

This application is the National Stage filing under 35 U.S.C. 371 of International Application No. PCT/KR2021/019792, filed on Dec. 24, 2021, which claims the benefit of earlier filing date and right of priority to Korean Application Nos. 10-2021-0045933, filed on Apr. 8, 2021, and 10-2021-0045932, filed on Apr. 8, 2021, the contents of which are all incorporated by reference herein in their entirety.

TECHNICAL FIELD

The present disclosure relates to a display device.

BACKGROUND ART

As information society develops, the demand for display devices is also increasing in various forms. In response to this, various display devices such as Liquid Crystal Display Device (LCD), Organic Light Emitting Diode (OLED), and Micro LED have been researched and used in recent years.

Among these, a LCD panel includes a liquid crystal layer, and a TFT substrate and a color filter substrate that are opposite to each other with a liquid crystal layer interposed therebetween, and may display an image by using light provided from a backlight unit.

Recently, as interest in the image quality of display device increases, color expression or color reproduction that is close to true color has received significant attention, and much research has been devoted to improving image quality to improve light uniformity and realize true color.

DISCLOSURE OF INVENTION

Technical Problem

An object of the present disclosure is to solve the foregoing and other problems. Another object of the present disclosure may be to provide a display device capable of improving image quality.

Another object of the present disclosure may be to provide a display device capable of improving luminance and light uniformity of a backlight unit.

Another object of the present disclosure may be to provide a display device capable of effectively controlling light provided from a backlight unit.

Another object of the present disclosure may be to improve the purity of white light by improving a bluish phenomenon of light provided from a backlight unit.

Solution to Problem

According to an aspect of the present disclosure, a display device may include: a display panel; a frame which is positioned behind the display panel, and to which the display panel is coupled; a plurality of substrates which are positioned between the display panel and the frame, on which a plurality of light sources providing light to the display panel are mounted, and which are formed of flat plates separated from each other; and a reflective sheet positioned between the display panel and the plurality of substrates, covering the plurality of substrates, and having a plurality of holes corresponding to the plurality of light sources, wherein the plurality of substrates may include: a first substrate; a second substrate next to the first substrate; and a third substrate next to the second substrate, wherein the reflective sheet may include: a first reflective sheet covering at least a portion of the first substrate and a portion of the second substrate; and a second reflective sheet covering another portion of the second substrate and at least a portion of the third substrate.

Advantageous Effects of Invention

Effects of the display device according to the present disclosure are described as follows.

According to at least one of embodiments of the present disclosure, the image quality of a display device may be improved.

According to at least one of the embodiments of the present disclosure, a display device capable of improving luminance and light uniformity of a backlight unit may be provided.

According to at least one of the embodiments of the present disclosure, a display device capable of effectively controlling light provided from a backlight unit may be provided.

According to at least one of the embodiments of the present disclosure, the purity of white light may be increased by improving a bluish phenomenon of light provided from a backlight unit.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

BRIEF DESCRIPTION OF DRAWINGS

FIGS. 1 to 3 are diagrams illustrating examples of a display device according to embodiments of the present disclosure.

FIGS. 4 to 6 are diagrams illustrating examples of a substrate and light assembly providing light to a display device according to embodiments of the present disclosure.

FIGS. 7 to 21 are diagrams illustrating examples of a reflective sheet according to embodiments of the present disclosure.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings.

As such, the present disclosure should be construed to extend to any alterations, equivalents and substitutes in addition to those which are particularly set out in the accompanying drawings.

Hereinafter, a liquid crystal display device (LCD) will be described as an example of the display panel, but the display panel applicable to the present disclosure is not limited to the liquid crystal panel.

Referring to FIG. 1, the display device may include a first long side LS1, a second long side LS2 opposite to the first long side LS1, a first short side SS1 adjacent to the first long side LS1 and the second long side LS2, and a second short side SS2 opposite to the first short side SS1.

The first short side area SS1 may be referred to as a first side area, the second short side area SS2 may be referred to as a second side area opposite to the first side area, the first long side area LS1 may be referred to as a third side area which is adjacent to the first side area and the second side area and located between the first side area and the second side area, and the second long side region LS2 may be referred to as a fourth side area which is adjacent to the first side area and the second side area and located between the first side area and the second side area, and opposite to the third side area.

Although it is illustrated that the lengths of the first and second long sides LS1 and LS2 are longer than the lengths of the first and second short sides SS1 and SS2, the lengths of the first and second long sides LS1 and LS2 may be approximately equal to the lengths of the first and second short sides SS1 and SS2.

A first direction DR1 may be a direction parallel to the long sides LS1, LS2 of the display panel 100, and a second direction DR2 may be a direction parallel to the short sides SS1, SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side on which a display device displays an image may be referred to as a forward direction or a front side or front surface. When displaying an image on a display device, a side on which an image cannot be observed may be referred to as a rearward direction or a rear side or rear surface.

When viewing the display from the forward direction or front side, the side of the first long side LS1 may be referred to as an upper side or an upper surface. Similarly, the side of the second long side LS2 may be referred to as a lower side or a lower surface. Similarly, the side of the first short side SS1 may be referred to as a right side or right surface, and the side of the second short side SS2 may be referred to as a left side or left surface.

The first long side LS1, the second long side LS2, the first short side SS1, and the second short side SS2 may be referred to as an edge of the display device. In addition, a point where the first long side LS1, the second long side LS2, the first short side SS1, and the second short side SS2 meet each other may be referred to as a corner. For example, a point where the first long side LS1 and the first short side SS1 meet may be a first corner C1, a point where the first long side LS1 and the second short side SS2 meet may be a second corner C2, a point where the second short side SS2 and the second long side LS2 meet may be a third corner C3, and a point where the second long side LS2 and the first short side SS1 meet may be a fourth corner C4.

A direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as a up-down direction UD.

Referring to FIG. 2, a front cover 105 may cover at least a portion of the front and side surfaces of the display panel 110. The front cover 105 may be divided into a front cover located on the front surface of the display panel 110 and a side cover located on the side surface of the display panel 110. Any one of the front cover and the side cover may be omitted.

The display panel 110 may be provided on the front surface of the display device 100 and may display an image. The display panel 110 may display an image by outputting red, green, or blue (RGB) for each pixel according to a timing by a plurality of pixels. The display panel 110 may be divided into an active area in which an image is displayed and a de-active area in which an image is not displayed. The display panel 110 may include a front substrate and a rear substrate that are opposite to each other with a liquid crystal layer interposed therebetween.

The front substrate may include a plurality of pixels including red R, green G, and blue B sub-pixels. The front substrate may output light corresponding to red, green, or blue color according to a control signal.

The rear substrate may include switching elements. The rear substrate may switch a pixel electrode. For example, the pixel electrode may change the molecular arrangement of liquid crystal layer according to a control signal applied from the outside. The liquid crystal layer may include liquid crystal molecules. The arrangement of the liquid crystal molecules may change according to a voltage difference generated between the pixel electrode and the common electrode. The liquid crystal layer may transmit light provided from the backlight unit 120 to the front substrate or block the light.

The backlight unit 120 may be located in a rearward direction of the display panel 110. The backlight unit 120 may include light sources. The backlight unit 120 may be coupled to the frame 130 in a forward direction of the frame 130.

The backlight unit 120 may be driven by a full driving method or a partial driving method such as local dimming or impulsive. The backlight unit 120 may include an optical sheet 125 and an optical layer 123. The optical layer 123 may be referred to as an optical module 123 or an optical unit 123.

The optical sheet 125 may evenly transmit light from a light source to the display panel 110. The optical sheet 125 may include a plurality of layers. For example, the optical sheet 125 may include a prism sheet or a diffusion sheet.

The optical sheet 125 may include a coupling part 125d. The coupling part 125d may be coupled to the front cover 105, the frame 130, and/or the back cover 150. Alternatively, the coupling part 125d may be fastened to a structure formed on or coupled to the front cover 105, the frame 130, and/or the back cover 150.

The frame 130 may serve to support components of the display device 100. For example, component such as the backlight unit 120 may be coupled to the frame 130. The frame 130 may be made of a metal material such as aluminum alloy.

The back cover 150 may be located in the rear surface of or in the rearward direction of the display device 100. The back cover 150 may be coupled to the frame 130 and/or the front cover 105. For example, the back cover 150 may be an injection product made of resin.

Referring to FIG. 3, the substrate 122 may be configured in the form of a plurality of straps that extend in a first direction and are spaced apart at certain intervals in a second direction orthogonal to the first direction.

At least one light assembly 124 may be mounted on the substrate 122. An electrode pattern for connecting an adapter and a light assembly 124 may be formed on the substrate 122. For example, a carbon nanotube electrode pattern for connecting the light assembly 124 and the adapter may be formed on the substrate 122.

The substrate 122 may be made of at least one of polyethylene terephthalate PET, glass, polycarbonate PC, and silicon. The substrate 122 may be a printed circuit board (PCB) on which at least one light assembly 124 is mounted.

The light assembly 124 may be disposed on the substrate 122 with a certain interval in the first direction. The diameter of the light assembly 124 may be larger than the width of the substrate 122. This means that it may be larger than the length of the substrate 122 in the second direction.

The light assembly 124 may be a light emitting diode (LED) chip or a light emitting diode package including at least one light emitting diode chip.

The light assembly 124 may include a light source. The light source may be a colored LED or a white LED emitting at least one color among colors such as red, blue, and green. The colored LED may be a blue LED. For example, the light source may be a mini LED.

A reflective sheet 126 may be located in the front side of the substrate 122. The reflective sheet 126 may be located in an area of the substrate 122 excluding an area where the light assembly 124 is formed. The reflective sheet 126 may have a plurality of holes 235.

The reflective sheet 126 may reflect light emitted from the light assembly 124 toward the front surface side. In addition, the reflective sheet 126 may recycle light emitted from the light assembly 124.

The reflective sheet 126 may include at least one of metal and metal oxide as reflective material. For example, the reflective sheet 126 may include a metal having a high reflectance such as at least one of aluminum Al, silver Ag, gold Au, and titanium dioxide $TiO_2$, and/or a metal oxide.

A resin may be deposited or coated on the light assembly 124 and/or the reflective sheet 126. The resin may serve to diffuse light emitted from the light assembly 124.

An optical layer 129 may include a phosphor. The optical layer 129 may be formed as a plate or as a thin sheet. The optical layer 129 may include a red-based phosphor and/or a green-based phosphor. The optical layer 129 may change the wavelength or color of the light provided from the light assembly 124. For example, when blue-series light is provided from the light assembly 124, the optical layer 129 may change the blue-series light to white. The optical layer 129 may be referred to as a QD layer or QD sheet.

The optical sheet 125 may be located in a forward direction of the optical layer 129. The rear surface of the optical sheet 125 may closely adhere to the optical layer 129, and the front surface of the optical sheet 125 may closely adhere to or be adjacent to the rear surface of the display panel 110.

The optical sheet 125 may include at least one or more sheets. Specifically, the optical sheet 125 may include one or more prism sheets and/or one or more diffusion sheets. A plurality of sheets included in the optical sheet 125 may be in an adhesive and/or closely adhered state.

The optical sheet 125 may be composed of a plurality of sheets having different functions. For example, the optical sheet 125 may include first to third optical sheets 125a to 125c. For example, the first optical sheet 125a may be a diffusion sheet, and the second and third optical sheets 125b and 125c may be a prism sheet. The number and/or location of the diffusion sheet 125a and the prism sheet 125b, 125c may be changed.

The diffusion sheet 125a may prevent the light emitted from the optical layer 129 from being partially concentrated, thereby making light distribution more uniform. The prism sheet 125b, 125c may condense light emitted from the diffusion sheet 125a and provide light to the display panel 110.

The coupling part 125d may be formed in at least one of sides or edges of the optical sheet 125. The coupling part 125d may be formed in at least one of the first to third optical sheets 125a to 125c.

The coupling part 125d may be formed in the long side of the optical sheet 125. The coupling part 125d formed in the first long side and the coupling part 125d formed in the second long side may be asymmetric. For example, the locations and/or numbers of the coupling part 125d of first long side and the coupling part 125d of second long side may be different from each other.

Referring to FIGS. 4 and 5, the substrate 222 may be a plate. The front surface of the substrate 222 may be white. A white or reflective material may be coated on the front surface of the substrate 222. The light assembly 224 may be mounted on the substrate 222. The light assembly 224 may include a light source and a mini lens. For example, the light source may be a mini LED providing blue light. A plurality of light sources may be mounted on the substrate 222. A plurality of light sources may be disposed to form a plurality of rows and a plurality of columns.

An integrated device 2223 and a capacitor 2224 may be disposed around the light source 224. For example, the integrated device 2223 may be an IC chip 2223. A plurality of capacitors 2224 may be opposite to the integrated device 2223. The integrated device 2223 may adjust power provided to a certain number of light sources 224.

The supporter 2221 may be mounted on the substrate 222. The supporter 2221 may maintain a constant distance between the substrate 222 and the aforementioned optical layer 129. The supporter 2221 may have a cone shape as a whole. The supporter 2221 may be formed by double injection and bonded to the substrate 222. The supporter 2221 may be located between the light assemblies 224 and may be fixed on the substrate 222.

Referring to FIG. 6, a plurality of substrates 222 may be provided. The plurality of substrates 222 may include a first substrate 222a, a second substrate 222b, a third substrate 222c, a fourth substrate 222d, a fifth substrate 222e, a sixth substrate 222f, a seventh substrate 222g, an eighth substrate 222h, a ninth substrate 222i, and a tenth substrate 222j.

The first substrate 222a may be located in contact with the first long side LS1 and the first short side SS1 and may form a first corner C1. The second substrate 222b may be located in contact with the first short side SS1 and the second long side LS2 and may form a fourth corner C4. The second substrate 222b may adjoin the first substrate 222a in the up-down direction.

The ninth substrate 222i may be located in contact with the first long side LS1 and the second short side SS2 and may form a second corner C2. The tenth substrate 222j may be located in contact with the second short side SS2 and the second long side LS2 and may form a third corner C3. The tenth substrate 222*j* may adjoin the ninth substrate 222*i* in the up-down direction.

The fifth substrate 222*e* may contact the first long side LS1 and may be located between the first substrate 222*a* and the ninth substrate 222*i*. The sixth substrate 222*f* may contact the second long side LS2 and may be located between the second substrate 222*d* and the tenth substrate 222*j*. The sixth substrate 222*f* may adjoin the fifth substrate 222*e* in the up-down direction.

The third substrate 222*c* may contact the first long side LS1 and may be located between the first substrate 222*a* and the fifth substrate 222*e*. The fourth substrate 222*d* may contact the second long side LS2 and may be located between the second substrate 222*b* and the sixth substrate 222*f*. The fourth substrate 222*d* may adjoin the third substrate 222*c* in the up-down direction.

The seventh substrate 222*g* may contact the first long side LS1 and may be located between the fifth substrate 222*e* and the ninth substrate 222*i*. The eighth substrate 222*h* may contact the second long side LS2 and may be located between the sixth substrate 222*f* and the tenth substrate 222*j*. The eighth substrate 222*h* may adjoin the seventh substrate 222*g* in the up-down direction.

The reflective sheet 226 may cover the substrate 222. A plurality of reflective sheets 226 may be provided. The plurality of reflective sheets 226 may cover the plurality of substrates 222. The plurality of reflective sheets 226 may include a first reflective sheet 226*a*, a second reflective sheet 226*b*, a third reflective sheet 226*c*, a fourth reflective sheet 226*d*, a fifth reflective sheet 226*e*, and a sixth reflective sheet 226*f*.

The first reflective sheet 226*a* may cover the first substrate 222*a*. The first reflective sheet 226*a* may overlap the second substrate 222*b*, the third substrate 222*c*, and the fourth substrate 222*d*. The second reflective sheet 226*b* may cover at least a part or most of the second substrate 222*b* and may overlap the fourth substrate 222*d*.

The third reflective sheet 226*c* may cover at least a part or most of the fifth substrate 222*e*. The third reflective sheet 226*c* may overlap the third substrate 222*c*, the fourth substrate 222*d*, the sixth substrate 222*f*, and the seventh substrate 222*g*. The fourth reflective sheet 226*d* may cover at least a part or most of the sixth substrate 222*f*. The fourth reflective sheet 226*d* may overlap the fourth substrate 222*d*, the fifth substrate 222*e*, the sixth substrate 222*f*, and the seventh substrate 222*g*.

The fifth reflective sheet 226*e* may cover at least a part or most of the ninth substrate 222*i* and may overlap the seventh substrate 222*g*. The sixth reflective sheet 226*f* may cover the tenth substrate 222*j*. The sixth reflective sheet 226*f* may overlap the seventh substrate 222*g*, the eighth substrate 222*h*, and the ninth substrate 222*i*.

An area DA, a dot area DA, or a pattern area DA may be formed along the first long side LS1, the second long side LS2, the first short side SS1, and/or the second short side SS2.

Referring to FIGS. 7 and 8, the reflective sheet 226 may include a first side S1, a second side S2, a third side S3, and a fourth side S4. A side S may be referred to as an edge S.

The reflective sheet 226 may include a plurality of holes h and a plurality of cut-lines CL. The plurality of holes h may be formed to correspond to the light sources 224 or the light assemblies 224. The area of the hole h may be larger than the cross-sectional area of the light assembly 224.

The reflective sheet 226 may have an accommodating hole H. A cut-line CL3 may be formed around the accommodating hole H. The cut-line CL3 may be formed in the radial direction of the accommodating hole H. For example, the cut-line CL3 may have a +shape. The accommodating hole H may be referred to as a cut-line hole H. The integrated device 2223 may be located in the accommodating hole H. The area of the accommodating hole H may be larger than the cross-sectional area of the integrated device 2223. For example, the accommodating hole H may have a circular shape, and the integrated device 2223 may have a rectangular shape. A part of the integrated device 2223 may overlap the accommodating hole H, and the cut-line CL3 around the accommodating hole H may be widened.

The reflective sheet 226 may have a cutout line CL. For example, the cut-line CL may have a +shape. The cut-line CL1, CL2 may be located between the holes h, and may be located adjacent to the accommodating hole H. The first cut-line CL1 may be located between the holes h and adjacent to the accommodating hole H. The second cutout line CL2 may be opposite to the first cutout line CL1 with respect to the accommodating hole H. The accommodating hole H may be located between the first cutout line CL1 and the second cutout line CL2. Capacitors 2224 (see FIG. 5) adjacent to the integrated device 2223 may be located in the lower portion of the cut-lines CL1 and CL2, and the cut-lines CL1 and CL2 may be widened.

Accordingly, it is possible to prevent the reflective sheet 226 from being separated from the substrate 222, and improve light uniformity.

Referring to FIG. 9, the reflective sheet 226 may include a first area DA1 and a second area DA2. The first area DA1 may be referred to as a first dot area DA1 or a first pattern area DA1, and the second area DA2 may be referred to as a second dot area DA2 or a second pattern area DA2.

The first area DA1 may be formed long along the first side S1 and/or the fourth side S4. A first plurality of holes h may be sequentially formed in the first area DA1 while maintaining a constant gap. The first area DA1 may contact the first side S1 and/or the fourth side S4. The description of the first side S1 and/or the fourth side S4 may be applied to the other sides S2 and S3.

The second area DA2 may be formed long along the first side S1 and/or the fourth side S4. A second plurality of holes h may be sequentially formed in the second area DA2 while maintaining a constant gap. The second area DA2 may contact or adjoin the first area DA1. The distance of the second area DA2 from the first side S1 and/or the second side S2 may be larger than the distance of the first area DA1 from the first side S1 and/or the fourth side S4. The first area DA1 may be located between the second area DA2 and the first side S1 and/or the fourth side S4.

A light pattern LP, CLP may include a phosphor. The light pattern LP, CLP may include a red-based phosphor and a green-based phosphor. The light pattern LP, CLP may include a yellow-based phosphor.

For example, to the naked eye, the light pattern LP, CLP may have a yellow-based color. The light pattern LP, CLP may convert blue-based light provided from the light source 224 (see FIG. 5) or the light assembly 224 into white light.

For another example, to the naked eye, the light pattern LP, CLP may have a black or gray-based color. The light pattern LP, CLP may absorb light provided by the light source 224 (see FIG. 5) or the light assembly 224.

The light pattern LP, CLP may be formed in the first area DA1. The light pattern LP, CLP may be formed between the first plurality of holes h and the first side S1 and/or the fourth side S4. The light pattern LP, CLP may include a plurality of segments LP and CLP. The plurality of segments LP may be a long-extended line. Each of the plurality of lines LP may be located to correspond to each of the plurality of holes h. For example, the length of the line LP may correspond to the diameter of the hole h. For another example, the length of the line LP may be smaller than the diameter of the hole h. For another example, the length of the line LP may be larger than the diameter of the hole h.

A corner line CLP may extend while being bent, or may have a fan shape or a semicircular shape. For example, the corner line CLP may be a quarter circle. The corner line CLP may be located between the hole h closest to the second corner C2 and the second corner C2. The description of the second corner C2 may be applied to the other corners C1, C3, and C4.

Referring to FIG. 10, the reflective sheet 226 may include a first area DA1 and a second area DA2. The first area DA1 may be referred to as a first dot area DA1 or a first pattern area DA1, and the second area DA2 may be referred to as a second dot area DA2 or a second pattern area DA2.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. The description of the first side S1 and/or the fourth side S4 may be applied to the other sides S2 and S3.

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

A light pattern LP, CLP, DLP may include a phosphor. The light pattern LP, CLP, DLP may include a red-based phosphor and a green-based phosphor. The light pattern LP, CLP, DLP may include a yellow-based phosphor.

For example, to the naked eye, the light pattern LP, CLP, DLP may have a yellow-based color. The light pattern LP, CLP, DLP may convert blue-based light provided from the light source 224 (see FIG. 5) or the light assembly 224 into white light.

For another example, to the naked eye, the light pattern LP, CLP, DLP may have a black or gray-based color. The light pattern LP, CLP, DLP may absorb light provided by the light source 224 (see FIG. 5) or the light assembly 224.

The light pattern LP, CLP, DLP may be formed in the first area DA1. The light pattern LP, CLP may be formed between the first plurality of holes h and the first side S1 and/or the fourth side S4.

The light pattern LP may include a plurality of segments LP. The plurality of segments LP may be a long-extended line. Each of the plurality of lines LP may be located to correspond to each of the plurality of holes h. For example, the length of the line LP may correspond to the diameter of the hole h. For another example, the length of the line LP may be smaller than the diameter of the hole h. For another example, the length of the line LP may be larger than the diameter of the hole h.

The light pattern DLP may include a dot DLP. The dots DLP may be disposed around the hole h. For example, the number of dots DLP may be three. The line LP and the dot DLP may be disposed while surrounding the hole h. Two dots DLP may be opposite to each other with respect to the hole h, and one dot DLP may be opposite to the line LP with respect to the hole h.

The light pattern CLP may include a corner line CLP. The corner line CLP may extend while being bent, or may have a fan shape or a semicircular shape. For example, the corner line CLP may be a quarter circle. The corner line CLP may be located between the hole h closest to the second corner C2 and the second corner C2. The corner line CLP may be referred to as a curved line CLP. The dots DLP may be disposed around the hole h closest to the second corner C2. For example, the number of dots DLP may be five. Five dots DLP may be sequentially disposed around the hole h closest to the second corner C2 together with the corner line CLP. The dots DLP may be opposite to the corner line CLP with respect to the hole h. The description of the second corner C2 may be applied to the other corners C1, C3, and C4.

Referring to FIG. 11, the reflective sheet 226 may include a first area DA1, a second area DA2, a third area DA3, a fourth area DA4, and a central area CDA. The area DA may be referred to as a dot area DA.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. The description of the first side S1 and/or the fourth side S4 may be applied to the other sides S2 and S3.

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

The third area DA3 may be formed long along the first side S1 and/or the fourth side S4. A third plurality of holes h may be sequentially formed in the third area DA3 while maintaining a constant gap. The third area DA3 may contact or adjoin the second area DA2. The distance of the third area DA3 from the first side S1 and/or the fourth side S4 may be larger than the distance of the second area DA2 from the first side S1 and/or the fourth side S4. The second area DA2 may be located between the third area DA3 and the first area DA1.

The fourth area DA4 may be formed long along the first side S1. A fourth plurality of holes h may be sequentially formed in the fourth area DA4 while maintaining a constant gap. The fourth area DA4 may contact or adjoin the third area DA3. The distance of the fourth area DA4 from the first side S1 and/or the fourth side S4 may be larger than the distance of the third area DA3 from the first side S1 and/or the fourth side S4. The third area DA3 may be located between the fourth area DA4 and the second area DA2.

The central area CDA may be an area of the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, to the naked eye, the light pattern DLP may have a yellow-based color. The light pattern DLP may convert blue-based light provided from the light source 224 (see FIG. 5) or the light assembly 224 into white light.

For another example, to the naked eye, the light pattern DLP may have a black or gray-based color. The light pattern DLP may absorb light provided by the light source 224 (see FIG. 5) or the light assembly 224.

The light pattern DLP may include dots DLP. The dots DLP may be disposed around the hole h. The dots DLP may be disposed while surrounding the hole h.

The first dots DLP1 may be disposed around at least one hole h among the first plurality of holes h. For example, the number of first dots DLP1 may be eight, and the eight first dots DLP1 may be sequentially located around the hole h while maintaining a constant gap.

The second dots DLP2 may be disposed around at least one hole h among the second plurality of holes h. For example, the number of second dots DLP2 may be eight, and the eight second dots DLP2 may be sequentially located around the hole h while maintaining a constant gap.

The third dots DLP3 may be disposed around at least one of the third plurality of holes h. For example, the number of third dots DLP3 may be eight, and the eight third dots DLP3 may be sequentially located around the hole h while maintaining a constant gap.

The fourth dots DLP4 may be disposed around at least one of the fourth plurality of holes h. For example, the number of fourth dots DLP4 may be three or four, and the four fourth dots DLP4 may be sequentially located around the hole h while maintaining a constant gap. The number of dots DLP4 around the hole h adjacent to the cut-line CL1 may be three. The dot DLP4 may be excluded in an area adjacent to the cut-line CL1 around the hole h.

For example, the size of the first dot DLP1 may be larger than that of the second dot DLP2. The size of the second dot DLP2 may be larger than that of the third dot DLP3. The size of the third dot DLP3 may be larger than that of the fourth dot DLP4. For another example, the first dot DLP1, the second dot DLP2, the third dot DLP3, and the fourth dot DLP4 may have the same size. When the size of the dots DLP is the same, the number of dots DLP may increase.

The description of the second corner C2 may be applied to the other corners C1, C3, and C4.

Referring to FIG. 12, the reflective sheet 226 may include a first area DA1, a second area DA2, a third area DA3, a fourth area DA4, and a central area CDA. The area DA may be referred to as a dot area DA or a pattern area DA.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. The description of the first side S1 and/or the fourth side S4 may be applied to the other sides S2 and S3.

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

The third area DA3 may be formed long along the first side S1 and/or the fourth side S4. The third plurality of holes h may be sequentially formed in the third area DA3 while maintaining a constant gap. The third area DA3 may contact or adjoin the second area DA2. The distance of the third area DA3 from the first side S1 and/or the fourth side S4 may be larger than the distance of the second area DA2 from the first side S1 and/or the fourth side S4. The second area DA2 may be located between the third area DA3 and the first area DA1.

The fourth area DA4 may be formed long along the first side S1 and/or the fourth side S4. The fourth plurality of holes h may be sequentially formed in the fourth area DA4 while maintaining a constant gap. The fourth area DA4 may contact or adjoin the third area DA3. The distance of the fourth area DA4 from the first side S1 and/or the fourth side S4 may be larger than the distance of the third area DA3 from the first side S1 and/or the fourth side S4. The third area DA3 may be located between the fourth area DA4 and the second area DA2.

The central area CDA may be an area of the reflective sheet 226 excluding the first area DA1, the second area DA2, the third area DA3, and the fourth area DA4.

A light pattern DLP, LP may include a phosphor. The light pattern DLP, LP may include red-based phosphor and green-based phosphor. The light pattern DLP, LP may include a yellow-based phosphor.

For example, to the naked eye, the light pattern DLP, LP may have a yellow-based color. The light pattern DLP, LP may convert blue-based light provided by the light source 224 (see FIG. 5) or the light assembly 224 into white light.

For another example, to the naked eye, the light pattern DLP, LP may have black or gray-based color. The light pattern DLP, LP may absorb light provided by the light source 224 (see FIG. 5) or the light assembly 224.

The light pattern DLP may include dots DLP. The dots DLP may be disposed around the hole h. The dots DLP may be disposed while surrounding the hole h.

The first dots DLP1 may be disposed around at least one hole h among the first plurality of holes h. For example, the number of first dots DLP1 may be eight, and the eight first dots DLP1 may be sequentially located around the hole h while maintaining a constant gap.

The second dots DLP2 may be disposed around at least one hole h among the second plurality of holes h. For example, the number of second dots DLP2 may be eight, and the eight second dots DLP2 may be sequentially located around the hole h while maintaining a constant gap.

The third dots DLP3 may be disposed around at least one of the third plurality of holes h. For example, the number of third dots DLP3 may be eight, and the eight third dots DLP3 may be sequentially located around the hole h while maintaining a constant gap.

The fourth dots DLP4 may be disposed around at least one of the fourth plurality of holes h. For example, the number of fourth dots DLP4 may be three or four, and the four fourth dots DLP4 may be sequentially located around the hole h while maintaining a constant gap. The number of dots DLP4 around the hole h adjacent to the cut-line CL1 may be three. The dot DLP4 may be excluded in an area adjacent to the cut-line CL1 around the hole h.

For example, the size of the first dot DLP1 may be larger than that of the second dot DLP2. The size of the second dot DLP2 may be larger than that of the third dot DLP3. The size of the third dot DLP3 may be larger than that of the fourth dot DLP4. For another example, the first dot DLP1, the second dot DLP2, the third dot DLP3, and the fourth dot DLP4 may have the same size. When the size of the dot DLP is the same, the number of dots DLP may increase.

The light pattern LP may include a plurality of segments LP. The plurality of segments LP may be a long-extended line. Each of the plurality of lines LP may be located to correspond to each of the plurality of holes h. The plurality of lines LP may be located between the first plurality of holes h and the first side S1 and/or the fourth side S4. The plurality of lines LP may be located between the first dots DA1 and the first side S1 and/or the fourth side S4.

For example, the length of the line LP may correspond to the diameter of the hole h. For another example, the length of the line LP may be smaller than the diameter of the hole h. For another example, the length of the line LP may be larger than the diameter of the hole h.

The description of the second corner C2 may be applied to the other corners C1, C3, and C4.

Referring to FIG. 13, the reflective sheet 226 may include a first area DA1, a second area DA2, a third area DA3, a fourth area DA4, and a central area CDA. The area DA may be referred to as a dot area DA or a pattern area DA.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. The description of the first side S1 and/or the fourth side S4 may be applied to the other sides S2 and S3.

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

The third area DA3 may be formed long along the first side S1 and/or the fourth side S4. The third plurality of holes h may be sequentially formed in the third area DA3 while maintaining a constant gap. The third area DA3 may contact or adjoin the second area DA2. The distance of the third area DA3 from the first side S1 and/or the fourth side S4 may be larger than the distance of the second area DA2 from the first side S1 and/or the fourth side S4. The second area DA2 may be located between the third area DA3 and the first area DA1.

The fourth area DA4 may be formed long along the fourth side S4. The fourth plurality of holes h may be sequentially formed in the fourth area DA4 while maintaining a constant gap. The fourth area DA4 may contact or adjoin the third area DA3. The distance of the fourth area DA4 from the first side S1 and/or the fourth side S4 may be larger than the distance of the third area DA3 from the first side S1 and/or the fourth side S4. The third area DA3 may be located between the fourth area DA4 and the second area DA2.

The central area CDA may be an area of the reflective sheet 226 excluding the first area DA1, the second area DA2, the third area DA3, and the fourth area DA4.

A light pattern DLP, CLP may include a phosphor. The light pattern DLP, CLP may include red-based phosphor and green-based phosphor. The light pattern DLP, CLP may include a yellow-based phosphor.

For example, to the naked eye, the light pattern DLP, CLP may have a yellow-based color. The light pattern DLP, CLP may convert blue-based light provided from the light source 224 (see FIG. 5) or the light assembly 224 into white light.

For another example, to the naked eye, the light pattern DLP, CLP may have a black or gray-based color. The light pattern DLP, CLP may absorb light provided by the light source 224 (see FIG. 5) or the light assembly 224.

The light pattern DLP may include dots DLP. The dots DLP may be disposed around the hole h. The dots DLP may be disposed while surrounding the hole h.

The curved line CLP may be disposed around at least one hole h among the first plurality of holes h. The curved line CLP may have a ring shape as a whole. The curved line CLP may extend long along the outer diameter of the hole h. A part of the curved line CLP may be open. The open portion of the curved line CLP may be face the first side S1 or the fourth side S4.

The second dots DLP2 may be disposed around at least one hole h among the second plurality of holes h. For example, the number of second dots DLP2 may be eight, and the eight second dots DLP2 may be sequentially located around the hole h while maintaining a constant gap.

The third dots DLP3 may be disposed around at least one of the third plurality of holes h. For example, the number of third dots DLP3 may be eight, and the eight third dots DLP3 may be sequentially located around the hole h while maintaining a constant gap.

The fourth dots DLP4 may be disposed around at least one of the fourth plurality of holes h. For example, the number of fourth dots DLP4 may be three or four, and the four fourth dots DLP4 may be sequentially located around the hole h while maintaining a constant gap. The number of dots DLP4 around the hole h adjacent to the cut-line CL1, CL2, CL3 may be three. The dot DLP4 may be excluded in an area adjacent to the cut-line CL1, CL2, CL3 around the hole h.

For example, the size of the second dot DLP2 may be larger than that of the third dot DLP3. The size of the third dot DLP3 may be larger than that of the fourth dot DLP4. For another example, the second dot DLP2, the third dot DLP3, and the fourth dot DLP4 may have the same size. When the size of the dot DLP is the same, the number of dot DLP may increase.

The description of the second corner C2 may be applied to the other corners C1, C3, and C4.

Referring to FIG. 14, the reflective sheet 226 may include a first area DA1, a second area DA2, a third area DA3, and a fourth area DA4. The area DA may be referred to as a dot area DA or a pattern area DA.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. Description of the first side S1 and/or the fourth side S4 may be applied to the other sides S2 and S3 (see FIG. 7).

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

The third area DA3 may be formed long along the first side S1 and/or the fourth side S4. The third plurality of holes h may be sequentially formed in the third area DA3 while maintaining a constant gap. The third area DA3 may contact or adjoin the second area DA2. The distance of the third area DA3 from the first side S1 and/or the fourth side S4 may be larger than the distance of the second area DA2 from the first side S1 and/or the fourth side S4. The second area DA2 may be located between the third area DA3 and the first area DA1.

The fourth area DA4 may be formed long along the first side S1. The fourth plurality of holes h may be sequentially formed in the fourth area DA4 while maintaining a constant gap. The fourth area DA4 may contact or adjoin the third area DA3. The distance of the fourth area DA4 from the first side S1 and/or the fourth side S4 may be larger than the distance of the third area DA3 from the first side S1 and/or the fourth side S4. The third area DA3 may be located between the fourth area DA4 and the second area DA2.

The light pattern DLP, CLP may include a phosphor. The light pattern DLP, CLP may include red-based phosphor and green-based phosphor. The light pattern DLP, CLP may include a yellow-based phosphor.

For example, to the naked eye, the light pattern DLP, CLP may have a yellow-based color. The light pattern DLP, CLP may convert blue-based light provided from the light source 224 (see FIG. 5) or the light assembly 224 into white light.

For another example, to the naked eye, the light pattern DLP, CLP may have a black or gray-based color. The light pattern DLP, CLP may absorb light provided by the light source 224 (see FIG. 5) or the light assembly 224.

The light pattern DLP may include dots DLP. The dots DLP may be disposed around the hole h. The dots DLP may be disposed while surrounding the hole h.

The curved line CLP may be disposed around at least one hole h among the first plurality of holes h. The curved line CLP may have a ring, semicircle, or sector shape as a whole. The curved line CLP may extend long along the outer diameter of the hole h while drawing a circular arc. A part of the curved line CLP may be open. An open portion of the curved line CLP may face the fourth side S4. The curved line CLP may be formed adjacent to the first side S1.

In the hole h adjacent to the first side S1, the curved line CLP1 may be located between the hole h and the first side S1. The dots DLP1 may face the curved line CLP1 with respect to the hole h. For example, the circular arc formed by the dots DLP1 may be larger than the circular arc formed by the curved line CLP1. For another example, five dots DLP1 may be disposed around the hole h, and the curved line CLP1 may be disposed in the remaining area. The curvature of a circular arc formed by the five dots DLP1 and the curvature of the circular arc formed by the curved line CLP1 may be the same.

In the hole h adjacent to the fourth side S4, the curved line CLP2 may be disposed around the hole h, and the open portion of the curved line CLP2 may face the fourth side S4. The width of the curved line CLP2 adjacent to the fourth side S4 may be substantially the same as the width of the curved line CLP1 adjacent to the first side S1.

The second dots DLP2 may be disposed around at least one hole h among the second plurality of holes h. For example, the number of second dots DLP2 may be eight, and the eight second dots DLP2 may be sequentially located around the hole h while maintaining a constant gap. The number of dots DLP2 around the hole h adjacent to the cut-line CL2 may be six. The dot DLP2 may be excluded in an area adjacent to the cut-line CL2 around the hole h.

The third dots DLP3 may be disposed around at least one of the third plurality of holes h. For example, the number of third dots DLP3 may be eight, and the eight third dots DLP3 may be sequentially located around the hole h while maintaining a constant gap.

The fourth dots DLP4 may be disposed around at least one of the fourth plurality of holes h. For example, the number of fourth dots DLP4 may be three or four, and the four fourth dots DLP4 may be sequentially located around the hole h while maintaining a constant gap. The number of dots DLP4 around the hole h adjacent to the cut-line CL4 may be three. The dot DLP4 may be excluded in an area adjacent to the cut-line CL4 around the hole h.

For example, the size of the second dot DLP2 may be larger than that of the third dot DLP3. The size of the third dot DLP3 may be larger than that of the fourth dot DLP4. For another example, the second dot DLP2, the third dot DLP3, and the fourth dot DLP4 may have the same size. When the size of the dots DLP is the same, the number of dots DLP may increase.

The description of the second corner C2 may be applied to the other corners C1, C3, and C4.

Referring to FIG. 15, the reflective sheet 226 may include a first area DA1, a second area DA2, a third area DA3, a fourth area DA4, a central area CDA, and a middle area MDA1, MDA2, and a triangular area TDA. The area DA may be referred to as a dot area DA or a pattern area DA.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. Description of the first side S1 and/or the fourth side S4 may be applied to the other sides S2 and S3 (see FIG. 7).

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

The third area DA3 may be formed long along the first side S1 and/or the fourth side S4. The third plurality of holes h may be sequentially formed in the third area DA3 while maintaining a constant gap. The third area DA3 may contact or adjoin the second area DA2. The distance of the third area DA3 from the first side S1 and/or the fourth side S4 may be larger than the distance of the second area DA2 from the first side S1 and/or the fourth side S4. The second area DA2 may be located between the third area DA3 and the first area DA1.

The fourth area DA4 may be formed long along the first side S1 and/or the fourth side S4. The fourth plurality of holes h may be sequentially formed in the fourth area DA4 while maintaining a constant gap. The fourth area DA4 may contact or adjoin the third area DA3. The distance of the fourth area DA4 from the first side S1 and/or the fourth side S4 may be larger than the distance of the third area DA3 from the first side S1 and/or the fourth side S4. The third area DA3 may be located between the fourth area DA4 and the second area DA2.

The central area CDA may be an area of the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, to the naked eye, the light pattern DLP may have a yellow-based color. The light pattern DLP may convert blue-based light provided from the light source 224 (see FIG. 5) or the light assembly 224 into white light.

For another example, to the naked eye, the light pattern DLP may have a black or gray-based color. The light pattern DLP may absorb light provided by the light source 224 (see FIG. 5) or the light assembly 224.

The light pattern DLP may include dots DLP. The dots DLP may be disposed around the hole h. The dots DLP may be disposed while surrounding the hole h.

The first dots DLP1 may be disposed around at least one hole h among the first plurality of holes h. For example, the number of first dots DLP1 may be eight, and the eight first dots DLP1 may be sequentially located around the hole h while maintaining a constant gap.

The second dots DLP2 may be disposed around at least one hole h among the second plurality of holes h. For example, the number of second dots DLP2 may be eight, and the eight second dots DLP2 may be sequentially located around the hole h while maintaining a constant gap.

The third dots DLP3 may be disposed around at least one of the third plurality of holes h. For example, the number of third dots DLP3 may be eight, and the eight third dots DLP3 may be sequentially located around the hole h while maintaining a constant gap.

The fourth dots DLP4 may be disposed around at least one of the fourth plurality of holes h. For example, the number of fourth dots DLP4 may be three or four, and the four fourth dots DLP4 may be sequentially located around the hole h while maintaining a constant gap. The number of dots DLP4 around the hole h adjacent to the cut-line CL1 may be three. The dot DLP4 may be excluded in an area adjacent to the cut-line CL1 around the hole h.

For example, the size of the first dot DLP1 may be larger than that of the second dot DLP2. The size of the second dot DLP2 may be larger than that of the third dot DLP3. The size of the third dot DLP3 may be larger than that of the fourth dot DLP4.

For another example, the first dot DLP1, the second dot DLP2, the third dot DLP3, and the fourth dot DLP4 may have the same size. When the size of the dot DLP is the same, the number of dots DLP may increase.

The middle area MDA1 may be located between the first plurality of holes h. The middle area MDA1 may be formed between the first plurality of holes h adjacent to the first side S1. The middle area MDA1 may be formed to extend long in a direction which intersects or is perpendicular to the longitudinal direction of the first side S1. The dots DLP1 may be disposed in the middle area MDA1. For example, a plurality of dots DLP1 may be disposed in the longitudinal direction of the middle area MDA1. For example, the number of dots DLP1 may be two.

The middle area MDA2 may be located between the first plurality of holes h. The middle area MDA2 may be formed between the first plurality of holes h adjacent to the fourth side S4. A plurality of middle areas MDA2 may be formed between the first plurality of holes h adjacent to the fourth side S4. The middle area MDA2 may form a triangle. The dots DLP1 may be disposed in the middle area MDA2. For example, a plurality of dots DLP1 may be disposed in the middle area MDA2. For example, the number of dots DLP1 may be three.

The middle area MDA2 may be located between the second plurality of holes h. The middle area MDA2 may be formed between the second plurality of holes h adjacent to the fourth side S4. A plurality of middle areas MDA2 may be formed between the second plurality of holes h adjacent to the fourth side S4. The middle area MDA2 may form a triangle. The dots DLP2 may be disposed in the middle area MDA2. For example, a plurality of dots DLP2 may be disposed in the middle area MDA2. For example, the number of dots DLP2 may be three.

The middle area MDA2 may be formed between the first area DA1 and the second area DA2. The middle area MDA2 may be formed between the second area DA2 and the third area DA3. The middle area MDA2 may form a triangular area TDA across the second area DA2 and the third area DA3 as a whole.

The description of the second corner C2 may be applied to the other corners C1, C3, and C4.

Referring to FIG. 16, the reflective sheet 226 may include a first area DA1, a second area DA2, a third area DA3, a fourth area DA4, a central area CDA, and a middle area MDA1, MDA2. The area DA may be referred to as a dot area DA or a pattern area DA.

The first area DA1 may be formed long along the first side S1 and/or the fourth side S4. The first plurality of holes h may be sequentially formed in the first area DA1 while maintaining a constant gap. The first area DA1 may contact the first side S1 and/or the fourth side S4. Description of the first side S1 and/or the fourth side S4 may be applied to the other sides S2 and S3 (see FIG. 7).

The second area DA2 may be formed long along the first side S1 and/or the fourth side S4. The second plurality of holes h may be sequentially formed in the second area DA2 while maintaining a constant gap. The second area DA2 may contact or adjoin the first area DA1. The distance of the second area DA2 from the first side S1 and/or the fourth side S4 may be larger than the distance of the first area DA1 from the first side S1 and/or the fourth side S4. The first area DA1 may be located between the second area DA2 and the first side S1 and/or the fourth side S4.

The third area DA3 may be formed long along the first side S1 and/or the fourth side S4. The third plurality of holes h may be sequentially formed in the third area DA3 while maintaining a constant gap. The third area DA3 may contact or adjoin the second area DA2. The distance of the third area DA3 from the first side S1 and/or the fourth side S4 may be larger than the distance of the second area DA2 from the first side S1 and/or the fourth side S4. The second area DA2 may be located between the third area DA3 and the first area DA1.

The fourth area DA4 may be formed long along the first side S1 and/or the fourth side S4. The fourth plurality of holes h may be sequentially formed in the fourth area DA4 while maintaining a constant gap. The fourth area DA4 may contact or adjoin the third area DA3. The distance of the fourth area DA4 from the first side S1 and/or the fourth side S4 may be larger than the distance of the third area DA3 from the first side S1 and/or the fourth side S4. The third area DA3 may be located between the fourth area DA4 and the second area DA2.

The central area CDA may be an area of the reflective sheet 226 excluding the first area DA1, the second area DA2, the third area DA3, and the fourth area DA4.

The light pattern DLP may include a phosphor. The light pattern DLP may include a red-based phosphor and a green-based phosphor. The light pattern DLP may include a yellow-based phosphor.

For example, to the naked eye, the light pattern DLP may have a yellow-based color. The light pattern DLP may convert blue-based light provided from the light source 224 (see FIG. 5) or the light assembly 224 into white light.

For another example, to the naked eye, the light pattern DLP may have a black or gray-based color. The light pattern DLP may absorb light provided by the light source 224 (see FIG. 5) or the light assembly 224.

The light pattern DLP may include dots DLP. The dots DLP may be disposed around the hole h. The dots DLP may be disposed while surrounding the hole h.

The first dots DLP1 may be disposed around at least one hole h among the first plurality of holes h. For example, the number of first dots DLP1 may be eight, and the eight first dots DLP1 may be sequentially located around the hole h while maintaining a constant gap.

The second dots DLP2 may be disposed around at least one hole h among the second plurality of holes h. For example, the number of second dots DLP2 may be eight, and the eight second dots DLP2 may be sequentially located around the hole h while maintaining a constant gap.

The third dots DLP3 may be disposed around at least one of the third plurality of holes h. For example, the number of third dots DLP3 may be eight, and the eight third dots DLP3 may be sequentially located around the hole h while maintaining a constant gap.

The fourth dots DLP4 may be disposed around at least one of the fourth plurality of holes h. For example, the number of fourth dots DLP4 may be four, and the four fourth dots DLP4 may be sequentially located around the hole h while maintaining a constant gap.

For example, the size of the first dot DLP1 may be larger than that of the second dot DLP2. The size of the second dot DLP2 may be larger than that of the third dot DLP3. The size of the third dot DLP3 may be larger than that of the fourth dot DLP4.

For another example, the first dot DLP1, the second dot DLP2, the third dot DLP3, and the fourth dot DLP4 may have the same size. When the size of the dot DLP is the same, the number of dots DLP may increase.

The middle area MDA1 may be located between the first plurality of holes h. The middle area MDA1 may be formed between the first plurality of holes h adjacent to the fourth side S4. The middle area MDA1 may be formed to extend long in a direction which intersects or is perpendicular to the longitudinal direction of the fourth side S4. The dots DLP1 may be disposed in the middle area MDA1. For example, a plurality of dots DLP1 may be disposed in the longitudinal direction of the middle area MDA1. For example, the number of dots DLP1 may be two.

The middle area MDA2 may be located between the first plurality of holes h. The middle area MDA2 may be formed between the first plurality of holes h adjacent to the first side S1. A plurality of middle areas MDA2 may be formed between the first plurality of holes h adjacent to the first side S1. The middle area MDA2 may form a triangle. The dots DLP1 may be disposed in the middle area MDA2. For example, a plurality of dots DLP1 may be disposed in the middle area MDA2. For example, the number of dots DLP1 may be three.

The middle area MDA1 may be located between the second plurality of holes h. The middle area MDA1 may be formed between the second plurality of holes h adjacent to the fourth side S4. The middle area MDA1 may be formed to extend long in a direction which intersects or is perpendicular to the longitudinal direction of the fourth side S4. The dots DLP2 may be disposed in the middle area MDA1. For example, a plurality of dots DLP2 may be disposed in the longitudinal direction of the middle area MDA1. For example, the number of dots DLP2 may be two.

The middle area MDA2 may be located between the second plurality of holes h. The middle area MDA2 may be formed between the second plurality of holes h adjacent to the first side S1. A plurality of middle areas MDA2 may be formed between the second plurality of holes h adjacent to the first side S1. The middle area MDA2 may form a triangle. The dots DLP2 may be disposed in the middle area MDA2. For example, a plurality of dots DLP2 may be disposed in the middle area MDA2. For example, the number of dots DLP2 may be three.

The middle area MDA1 may be located between the third plurality of holes h. The middle area MDA1 may be formed between the third plurality of holes h adjacent to the fourth side S4. The middle area MDA1 may be formed to extend long in a direction which intersects or is perpendicular to the longitudinal direction of the fourth side S4. The dots DLP3 may be disposed in the middle area MDA1. For example, a plurality of dots DLP3 may be disposed in the longitudinal direction of the middle area MDA1. For example, the number of dots DLP3 may be two.

The middle area MDA2 may be located between the third plurality of holes h. The middle area MDA2 may be formed between the third plurality of holes h adjacent to the first side S1. A plurality of middle areas MDA2 may be formed between the third plurality of holes h adjacent to the first side S1. The middle area MDA2 may form a triangle. The dots DLP3 may be disposed in the middle area MDA2. For example, a plurality of dots DLP3 may be disposed in the middle area MDA2. For example, the number of dots DLP3 may be three.

The middle area MDA2 may be formed between the first area DA1 and the second area DA2. The middle area MDA2 may be formed between the second area DA2 and the third area DA3.

The description of the second corner C2 may be applied to the other corners C1, C3, and C4.

Referring to FIGS. 17 and 19, the fifth reflective sheet 226e may cover a part of the ninth substrate 222i and a part of the seventh substrate 222g. The fifth substrate 226e may cover a boundary between the ninth substrate 222i and the seventh substrate 222g.

The sixth reflective sheet 226f may cover the whole of the tenth substrate 222j. The sixth reflective sheet 226f may cover a part of the eighth substrate 222h, a part of the seventh substrate 222g, and a part of the ninth substrate 222i. The sixth reflective sheet 226f may cover the boundary between the ninth substrate 222i and the tenth substrate 222j, may cover the boundary between the eighth substrate 222h and the tenth substrate 222j, may cover the boundary between the seventh substrate 222g and the ninth substrate 222i, and may cover the boundary between the seventh substrate 222g and the eighth substrate 222h.

The third reflective sheet 226c may cover a part of the fifth substrate 222e, a part of the sixth substrate 222f, and a part of the seventh substrate 222g. The third reflective sheet 226c may cover a boundary between the fifth substrate 222e and the sixth substrate 222f. The third reflective sheet 226c may cover a boundary between the seventh substrate 226g and the fifth substrate 222e.

The fourth reflective sheet 226d may cover a part of the sixth substrate 222f and a part of the eighth substrate 222h, and simultaneously cover a part of the fifth substrate 222e and a part of the seventh substrate 222g. The fourth reflective sheet 226d may simultaneously cover a boundary between the fifth substrate 222e and the sixth substrate 222f, a boundary between the seventh substrate 222g and the eighth substrate 222h, a boundary between the sixth substrate 222f and the eighth substrate 222h, and a boundary between the fifth substrate 222e and the seventh substrate 222g.

The lower side of the fifth reflective sheet 226e may face or contact the upper side of the sixth reflective sheet 226f and the upper side of the fourth reflective sheet 226d. The right side of the fifth reflective sheet 226e may face or contact the left side of the third reflective sheet 226c. The lower side of the third reflective sheet 226c may face or contact the upper side of the fourth reflective sheet 226d. The left side of the fourth reflective sheet 226d may face or contact the right side of the sixth reflective sheet 226f.

Referring to FIGS. 18 and 19, the first reflective sheet 226a may cover the whole of the first substrate 222a, and may cover a part of the second substrate 222b, a part of the third substrate 222c, and a part of the fourth substrate 222d. The first reflective sheet 226a may cover a boundary between the first substrate 222a and the second substrate 222b, a boundary between the first substrate 222a and the third substrate 222c, a boundary between the second substrate 222b and the fourth substrate 222d, a boundary of the third substrate 222c, and a boundary of the fourth substrate 222d.

The second reflective sheet 226b may cover a part of the second substrate 222b and a part of the fourth substrate 222d. The second reflective sheet 226b may cover a boundary between the second substrate 222b and the fourth substrate 222d.

The third reflective sheet 226c may cover a part of the fifth substrate 222e, a part of the third substrate 222c, a part of the fourth substrate 222d, and a part of the sixth substrate 222f. The third reflective sheet 226c may cover a boundary between the third substrate 222c and the fifth substrate 222e, a boundary between the third substrate 222c and the fourth substrate 222d, a boundary between the fourth substrate 222d and the sixth substrate 222f, and a boundary between the fifth substrate 222e and the sixth substrate 222f.

The fourth reflective sheet 226d may cover a part of the sixth substrate 222f, a part of the fourth substrate 222d, and a part of the fifth substrate 222e. The fourth reflective sheet 226d may cover a boundary between the fourth substrate 222d and the sixth substrate 222f and a boundary between the fifth substrate 222e and the sixth substrate 222f.

The lower side of the first reflective sheet 226a may face or contact the upper side of the second reflective sheet 226b. The left side of the first reflective sheet 226a may face or contact the right side of the third reflective sheet 226c. The upper side of the second reflective sheet 226b may face or contact the lower side of the first reflective sheet 226a and the lower side of the third reflective sheet 226c. The left side of the second reflective sheet 226b may face or contact the right side of the fourth reflective sheet 226d.

The lower side of the third reflective sheet 226c may face to or contact the upper side of the second reflective sheet 226b and the upper side of the fourth reflective sheet 226d. The right side of the third reflective sheet 226c may face or contact the left side of the first reflective sheet 226a. The upper side of the fourth reflective sheet 226d may face or contact the lower side of the third reflective sheet 226c. The right side of the fourth reflective sheet 226d may face or contact the left side of the first reflective sheet 226a.

Referring to FIGS. 20 and 21, the third reflective sheet 226c may overlap the fourth reflective sheet 226d. The third reflective sheet 226c may include a first lower side 226cs1, a second lower side 226cs2, and a third lower side 226cs3. The fourth reflective sheet 226d may include a first upper side 226ds1, a second upper side 226ds2, and a third upper side 226ds3.

The first lower side 226cs1 of the third reflective sheet 226c may face or contact the first upper side 226ds1 of the fourth reflective sheet 226d. The third lower side 226cs3 of the third reflective sheet 226c may face or contact the third upper side 226ds3 of the fourth reflective sheet 226d. The fourth reflective sheet 226d may cover the second lower side 226cs2 of the third reflective sheet 226c. The second lower side 226cs2 of the third reflective sheet 226c may be opposite to the second lower side 226ds2 of the fourth reflective sheet 226d.

For example, the first upper side 226ds1 of the fourth reflective sheet 226d, the third lower side 226cs3 of the third reflective sheet 226c, the second upper side 226ds2 of the fourth reflective sheet 226d, and the second lower side 226cs2 of the third reflective sheet 226c may form a rectangle.

For another example, the first lower side 226cs1 of the third reflective sheet 226c, the third upper side 226ds3 of the fourth reflective sheet 226d, the second lower side 226cs2 of the third reflective sheet 226c, and the second upper side 226ds2 of the fourth reflective sheet 226d may form a rectangle.

Referring to FIGS. 1 to 21, a display device includes: a display panel; a frame which is positioned behind the display panel, and to which the display panel is coupled; a plurality of substrates which are positioned between the display panel and the frame, on which a plurality of light sources providing light to the display panel are mounted, and which are formed of flat plates separated from each other; and a reflective sheet positioned between the display panel and the plurality of substrates, covering the plurality of substrates, and having a plurality of holes corresponding to the plurality of light sources, wherein the plurality of substrates may include: a first substrate; a second substrate next to the first substrate; and a third substrate next to the second substrate, wherein the reflective sheet may include: a first reflective sheet covering at least a portion of the first substrate and a portion of the second substrate; and a second reflective sheet covering another portion of the second substrate and at least a portion of the third substrate.

In the first reflective sheet, a lateral side crossing the second substrate may face or contact a lateral side of the second reflective sheet crossing the second substrate.

A boundary formed by the lateral side of the first reflective sheet and the lateral side of the second reflective sheet may be a straight line.

A boundary formed between the lateral side of the first reflective sheet and the lateral side of the second reflective sheet may be a broken straight line.

The first reflective sheet may be at least partially overlapped with the second reflective sheet on the second substrate.

The display panel may include: a first long side; a second long side opposite to the first long side; a first short side connecting one end of the first long side and one end of the second long side; and a second short side opposite to the first short side, and connecting the other end of the first long side and the other end of the second long side.

The plurality of substrates may include: a first substrate next to the first long side and the first short side; a second substrate next to the second long side, the first short side, and the first substrate; a third substrate next to the first long side and the first substrate; a fourth substrate next to the second long side, the third substrate, and the second substrate; a fifth substrate next to the first long side and the third substrate; a sixth substrate next to the second long side, the fifth substrate, and the fourth substrate; a seventh substrate next to the first long side and the fifth substrate; an eighth substrate next to the second long side, the seventh substrate, and the sixth substrate; a ninth substrate next to the first long side, the second short side, and the seventh substrate; and a tenth substrate next to the second long side, the second short side, the ninth substrate, and the eighth substrate.

The first reflective sheet may cover a boundary between the first substrate and the second substrate, a boundary between the first substrate and the third substrate, a boundary between the third substrate and the fourth substrate, and a boundary between the second substrate and the fourth substrate.

The second reflective sheet may cover a boundary between the second substrate and the fourth substrate.

The reflective sheet may further include a third reflective sheet covering a boundary between the third substrate and the fifth substrate, a boundary between the third substrate and the fourth substrate, a boundary between the fourth substrate and the sixth substrate, and a boundary between the fifth substrate and the sixth substrate.

The reflective sheet may further include a fourth reflective sheet covering a boundary between the fourth substrate and the sixth substrate, a boundary between the sixth substrate and the eighth substrate, a boundary between the fifth substrate and the sixth substrate, and a boundary between the seventh substrate and the eighth substrate.

The reflective sheet may further include a fifth reflective sheet covering a boundary between the seventh substrate and the ninth substrate.

The reflective sheet may further include a sixth reflective sheet covering a boundary between the eighth substrate and the tenth substrate, a boundary between the seventh substrate and the eighth substrate, and a boundary between the ninth substrate and the tenth substrate.

A portion of the third reflective sheet may overlap a portion of the fourth reflective sheet.

In the plurality of substrates, a surface on which the plurality of light sources may be mounted is coated with a reflective material.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a display panel;
a frame which is positioned behind the display panel, and to which the display panel is coupled;
a plurality of substrates which are positioned between the display panel and the frame, on which a plurality of light sources are mounted, wherein the plurality of light sources are configured to provide light to the display panel; and
a plurality of reflective sheets positioned between the display panel and the plurality of substrates, covering the plurality of substrates, and having a plurality of holes corresponding to the plurality of light sources,
wherein the plurality of substrates comprise:
a first substrate;
a second substrate next to the first substrate; and
a third substrate next to the second substrate, and
wherein the plurality of reflective sheets comprise:
a first reflective sheet covering at least a portion of the first substrate and a first portion of the second substrate; and
a second reflective sheet separated from the first reflective sheet, and covering second portion of the second substrate and at least a portion of the third substrate.

2. The display device of claim 1, wherein a lateral side of the first reflective sheet crossing the second substrate faces or contacts a lateral side of the second reflective sheet crossing the second substrate.

3. The display device of claim 2, wherein a boundary formed between the lateral side of the first reflective sheet and the lateral side of the second reflective sheet is a straight line.

4. The display device of claim 2, wherein a boundary formed between the lateral side of the first reflective sheet and the lateral side of the second reflective sheet is a broken straight line.

5. The display device of claim 1, wherein the first reflective sheet at least partially overlaps the second reflective sheet at the second substrate.

6. The display device of claim 1, wherein the display panel has:
a first long side;
a second long side opposite to the first long side;
a first short side connecting a first end of the first long side and a first end of the second long side; and
a second short side opposite to the first short side, and connecting a second end of the first long side and a second end of the second long side.

7. The display device of claim 6, wherein:
the first substrate is next to the first long side and the first short side of the display panel;
the second substrate is next to the second long side and the first short side of the display panel;
the third substrate is next to the second long side of the display panel and the second substrate; and
the plurality of substrates further comprise:
a fourth substrate next to the first long side of the display panel, the third substrate, and the first substrate;
a fifth substrate next to the first long side of the display panel and the fourth substrate;
a sixth substrate next to the second long side of the display panel, the fifth substrate, and the third substrate;
a seventh substrate next to the first long side of the display panel and the fifth substrate;
an eighth substrate next to the second long side of the display panel, the seventh substrate, and the sixth substrate;
a ninth substrate next to the first long side of the display panel, the second short side of the display panel, and the seventh substrate; and a tenth substrate next to the second long side of the display panel, the second short side of the display panel, the ninth substrate, and the eighth substrate.

8. The display device of claim 7, wherein the first reflective sheet covers a boundary between the first substrate and the second substrate, a boundary between the first substrate and the fourth substrate, a boundary between the third substrate and the fourth substrate, and a boundary between the second substrate and the third substrate.

9. The display device of claim 8, wherein the second reflective sheet covers a boundary between the second substrate and the third substrate.

10. The display device of claim 9, wherein the plurality of reflective sheets further comprise a third reflective sheet covering a boundary between the fourth substrate and the fifth substrate, a boundary between the third substrate and the fourth substrate, a boundary between the third substrate and the sixth substrate, and a boundary between the fifth substrate and the sixth substrate.

11. The display device of claim 10, wherein the plurality of reflective sheets further comprise a fourth reflective sheet covering a boundary between the third substrate and the sixth substrate, a boundary between the sixth substrate and the eighth substrate, a boundary between the fifth substrate and the sixth substrate, and a boundary between the seventh substrate and the eighth substrate.

12. The display device of claim 11, wherein the plurality of reflective sheets further comprise a fifth reflective sheet covering a boundary between the seventh substrate and the ninth substrate.

13. The display device of claim 12, wherein the plurality of reflective sheets further comprise a sixth reflective sheet covering a boundary between the eighth substrate and the tenth substrate, a boundary between the seventh substrate and the eighth substrate, and a boundary between the ninth substrate and the tenth substrate.

14. The display device of claim 13, wherein a portion of the third reflective sheet overlaps a portion of the fourth reflective sheet.

15. The display device of claim 1, wherein a surface of the plurality of substrates on which the plurality of light sources are mounted is coated with a reflective material.

16. The display device of claim 1, wherein the second substrate is next to the first substrate in a first direction, and
wherein the third substrate is next to the second substrate in a second direction intersecting with the first direction.

* * * * *